(12) United States Patent
Morgan et al.

(10) Patent No.: US 12,430,401 B2
(45) Date of Patent: Sep. 30, 2025

(54) SYSTEM FOR AUTOMATIC ERROR ESTIMATE CORRECTION FOR A MACHINE LEARNING MODEL

(71) Applicant: Wisconsin Alumni Research Foundation, Madison, WI (US)

(72) Inventors: Dane Morgan, Middleton, WI (US); Ryan Matthew Jacobs, Middleton, WI (US); Glenn Palmer, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 1000 days.

(21) Appl. No.: 17/467,638

(22) Filed: Sep. 7, 2021

(65) Prior Publication Data

US 2022/0076076 A1    Mar. 10, 2022

Related U.S. Application Data

(60) Provisional application No. 63/075,362, filed on Sep. 8, 2020.

(51) Int. Cl.
*G06F 18/21* (2023.01)
*G06N 7/01* (2023.01)

(52) U.S. Cl.
CPC ........ *G06F 18/2163* (2023.01); *G06F 18/217* (2023.01); *G06N 7/01* (2023.01)

(58) Field of Classification Search
CPC ..... G06F 18/2163; G06F 18/217; G06N 7/01; G06N 5/01; G06N 20/10; G06N 20/20; G06N 3/08

See application file for complete search history.

(56) References Cited

U.S. PATENT DOCUMENTS

| | | | |
|---|---|---|---|
| 2019/0258904 A1* | 8/2019 | Ma | G06F 18/24133 |
| 2020/0245910 A1* | 8/2020 | Mallas | A61B 5/7221 |
| 2021/0025695 A1* | 1/2021 | Li | G06N 3/04 |

OTHER PUBLICATIONS

Tian et al., "Quantitative structure-activity relationship (QSAR) models and their applicability domain analysis on HIV-1 protease inhibitors by machine learning methods", *Chemometrics and Intelligent Laboratory Systems*, Oct. 2019.

(Continued)

*Primary Examiner* — Austin Hicks
(74) *Attorney, Agent, or Firm* — Tarolli, Sundheim, Covell & Tummino LLP

(57) ABSTRACT

A computing device computes curve descriptive values to correct an error estimate of a prediction. A predefined number of times, an input dataset is split into a training dataset and a validation dataset, a predictive model and a domain model are trained, the trained predictive model and the trained domain model are validated, a predictive error value, a residual value, and a domain error value are computed, and each value is stored in output data. A domain threshold value is computed from the stored domain error values. Each predictive error value and each residual value stored in the output data is stored in in-domain output data when a respective domain error value is less than or equal to the computed domain threshold value. Curve descriptive values are computed to describe a relationship between the residual values as a function of the prediction error values stored in the in-domain output data.

20 Claims, 27 Drawing Sheets

(56) References Cited

OTHER PUBLICATIONS

Golbraikh et al., "Rational selection of training and test sets for the development of validated QSAR models," *Journal of Computer-Aided Molecular Design*, 17: 241-353, 2003.

Hirschfeld et al., "Uncertainty Quantification using Neural Networks for Molecular Property Prediction," arXiv:2005.1036v1 [cs.LG] May 20, 2020.

Fechner et al., "Estimation of the applicability domain of kernel-based machine learning models for virtual screening," *Journal of Cheminformatics* 2010, 2:2, 20 pages.

Janet et al., "A quantitative uncertainty metric controls error in neural network-driven chemical discovery," *Chem. Sci.*, 2019 DOI: 10.1039/c9sc02298H.

Klingspohn et al., "Efficiency of different measures for defining the applicability domain of classification models," *Journal of Cheminformatics*, vol. 9, Article No. 44, 2017.

Jason Brownlee, "Confidence Intervals for Machine Learning," from Machine Learning Mastery, last updated on Aug. 8, 2019.

Schroeter et al., "Estimating the Domain of Applicability for Machine Learning QSAR Models: A Study on Aqueous Solubility of Drug Discover Molecules," original publication available at www.springerlink.com, http://dx.doi.org/10.1007/s10822-007-9125-z, Jul. 21, 2007.

Musil et al., "Fast and Accurate Uncertainty Estimation in Chemical Machine Learning," *J. Chem. Theory Comput.* 2019, 15, 906-915.

A. Sofro and A. Oktaviarina, "Gaussian Process Regression Model in Spatial Logistic Regression," *J. Phys.: Conf. Ser.* 947 0120005, 2018.

Mathea et al., "Chemoinformatic Classification Methods and their Applicability Domain," *Mol. Int.* 2016, 35, 160-180.

Schwaighofer et al., "How Wrong Can We Get? A Review of Machine Learning Approaches and Error Bars," *Comb Chem High Throughput Screen*, Jun. 2009; 12(5):453-468.

Ruiz et al., "Study of the Applicability Domain of the QSAR Classification Models by Means of the Rivality and Modelability Indexes," *Molecules* 2018, 23, 2756; doi:10.3390/molecules23112756.

Wager et al., "Confidence Intervals for Random Forests: The Jackknife and the Infinitesimal Jackknife," *J Mach Learn Res.* Jan. 2014; 15(1): 1625-1651.

C.E. Rasmussen and C.K.I. Williams, "Chapter 2, Regression," Gaussian Processes for Machine Learning, the MIT Press, 2006.

\* cited by examiner

SYSTEM FOR AUTOMATIC ERROR ESTIMATE CORRECTION FOR A MACHINE LEARNING MODEL

CROSS-REFERENCE TO RELATED APPLICATIONS

The present application claims the benefit of and priority under 35 U.S.C. § 119(e) to U.S. Provisional Patent Application No. 63/075,362 filed Sep. 8, 2020, the entire contents of which are hereby incorporated by reference.

REFERENCE TO GOVERNMENT RIGHTS

This invention was made with government support under OCI1148011 awarded by the National Science Foundation. The government has certain rights in the invention.

BACKGROUND

Training accurate machine learning models involves multiple challenges. A first challenge is selection of a good set of input variables (feature set) that involves using various feature selection, feature extraction, and feature engineering techniques, as well as selecting the best model forms, generally with a goal to make accurate predictions. A second challenge is to select the hyperparameters used to train the model. Even after resolution of these types of challenges, a next challenge is determining an accurate estimate of the uncertainty associated with a predicted value. A further challenge is a determination of whether a new observation is within a domain within which the trained model is robust.

SUMMARY

In an example embodiment, a non-transitory computer-readable medium is provided having stored thereon computer-readable instructions that, when executed by a computing device, cause the computing device to compute an error estimate correction for a machine learning model. A predefined number of times, an input dataset that includes a plurality of observation vectors is split into a training dataset and a validation dataset, a predictive model and a domain model are trained with the training dataset, the trained predictive model and the trained domain model are validated with the validation dataset, a predictive error value and a residual value are computed from the validated predictive model and a domain error value is computed from the validated domain model for each observation vector of the plurality of observation vectors included in the validation dataset, and the computed predictive error value, the computed residual value, and the computed domain error value are stored in output data for each observation vector of the plurality of observation vectors included in the validation dataset.

A domain threshold value is computed using the stored domain error values. Each predictive error value and each residual value stored in the output data is stored in in-domain output data when a respective stored domain error value is less than or equal to the computed domain threshold value. Curve descriptive values are computed based on a type of curve, wherein the curve describes a relationship between the residual values stored in the in-domain output data as a function of the prediction error values stored in the in-domain output data. The curve descriptive values are output to correct an error estimate value of a predicted value of a new observation vector.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to compute an error estimate correction for a machine learning model.

In yet another example embodiment, a method of computing an error estimate correction for a machine learning model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
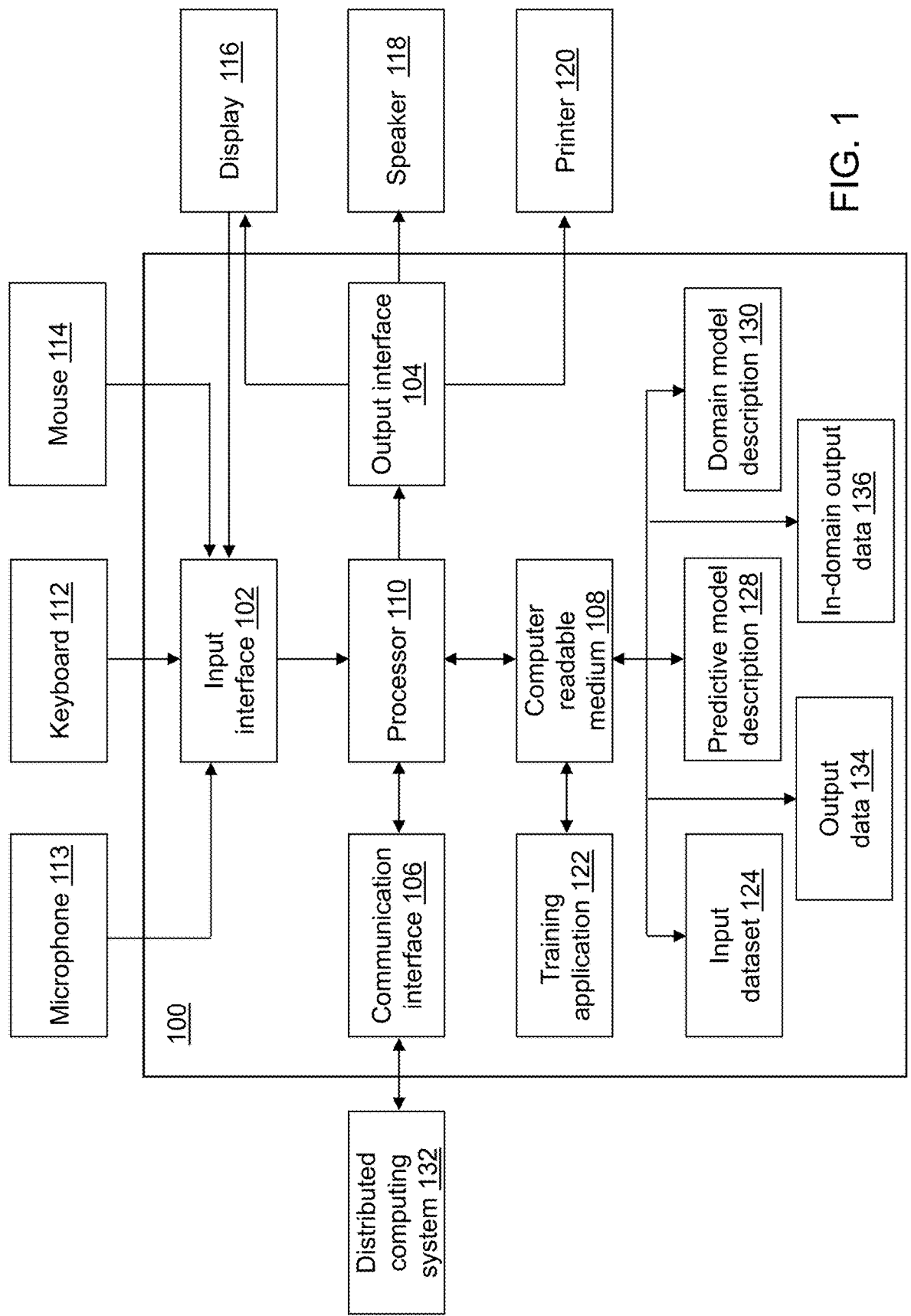
FIG. 1 depicts a block diagram of a model training device in accordance with an illustrative embodiment.

Referring to FIG. 1, a block diagram of a machine learning model training device 100 is shown in accordance with an illustrative embodiment. Model training device 100 may include an input interface 102, an output interface 104, a communication interface 106, a non-transitory computer-readable medium 108, a processor 110, a training application 122, an input dataset 124, a predictive model description 128, a domain model description 130, output data 134, and in-domain output data 136. Fewer, different, and/or additional components may be incorporated into model training device 100.

Input interface 102 provides an interface for receiving information from the user or another device for entry into model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model training device 100 or to make selections presented in a user interface displayed on display 116. The same interface may support both input interface 102 and output interface 104. For example, display 116 comprising a touch screen provides a mechanism for user input and for presentation of output to the user. Model training device 100 may have one or more input interfaces that use the same or a different input interface technology. The input interface technology further may be accessible by model training device 100 through communication interface 106.

Output interface 104 provides an interface for outputting information for review by a user of model training device 100 and/or for use by another application or device. For example, output interface 104 may interface with various output technologies including, but not limited to, display 116, a speaker 118, a printer 120, etc. Model training device 100 may have one or more output interfaces that use the same or a different output interface technology. The output interface technology further may be accessible by model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model training device 100 may have one or more communication interfaces that use the same or a different communication interface technology. For example, model training device 100 may support communication using an Ethernet port, a Bluetooth antenna, a telephone jack, a USB port, etc. Data and messages may be transferred between model training device 100 and another computing device of a distributed computing system 132 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model training device 100 also may have one or more drives that support the loading of a memory media such as a CD, DVD, an external hard drive, etc. One or more external hard drives further may be connected to model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model training device 100 may include a plurality of processors that use the same or a different processing technology. For example, model training device 100 may include a plurality of processors that support parallel processing, for example, using a plurality of threads.

Training application 122 performs operations associated with defining predictive model description 128 and domain model description 130 from data stored in input dataset 124. Predictive model description 128 may be used to classify, to predict, and/or to monitor data from data stored in a second dataset 324 (shown referring to FIG. 3). The predicted or classification date may be stored in a predicted dataset 326 (shown referring to FIG. 3) to support various data analysis functions as well as provide alert/messaging related to the monitored data. Domain model description 130 may be used to determine when an observation vector included in second dataset 324 is in the domain of a predictive model described by predictive model description 128. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. Data mining and data analytics is applicable in a wide variety of industries such as materials development.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables or features. Input dataset 124 may be transposed. The plurality of variables $v_i$ may define multiple dimensions for each observation vector of input dataset 124. An observation vector $x_i$ may include a value for each of the plurality of variables $v_i$ associated with the observation i, where i=1, . . . , $N_T$, where $N_T$ is a number of observations in input dataset 124.

Each variable of the plurality of variables $v_i$ may describe a characteristic of a physical object. For example, if input dataset 124 includes data related to operation of a vehicle, the variables may include an oil pressure, a speed, a gear indicator, a gas tank level, a tire pressure for each tire, an engine temperature, a radiator level, etc. Input dataset 124 may include data captured as a function of time for one or more physical objects. Each observation vector $x_i$ includes observation vector values $o_{i,j}$, where j=1, . . . , $N_v$ and i=1, . . . , $N_T$, where $N_v$ is a number of the plurality of variables $v_i$ that make up each observation vector in input dataset 124 though some values may be missing. Associated with each observation vector $x_i$ is a target variable value $y_i$, where i=1, . . . , $N_T$. Less than all of the columns of input dataset 124 may be used as variables that define each observation vector $x_i$ or target variable value $y_i$ used to define predictive model description 128 and domain model description 130. Thus, for illustration, input dataset 124 may include greater than $N_v$ columns.

In an illustrative application in the area of materials science, each observation vector $x_i$ corresponds with a system such as a material structure and composition to be modeled and observation vector values $o_{i,j}$ may be a value describing some feature of the system such as an amount of copper, and the target variable value $y_i$ is a vector of material properties to be modeled such as band gap. Each observation vector $x_i$ may start in the form of a human-relevant simple description such as a composition and structure, or a simplified molecular-input line-entry system (SMILES) string. Corresponding features in a numerical form may then be generated.

Machine learning can be used to predict the properties of new materials to enable the discovery, design and development of novel materials spanning an array of applications and materials classes by providing new understanding of key chemical or physical relationships governing properties of interest. As a concrete example, in the field of halide perovskites for solar photovoltaics, the use of machine learning on data resulted in assessment of chemical trends (e.g. halogen content and alkali vs. organic species content) on properties such as the bandgap and stability, and resulted in the prediction of new promising halide perovskite materials such as $Cs_2Au^{1+}Au^{3+}I_6$ and $NH_3NH_2InBr_3$. $Cs_2Au^{1+}Au^{3+}I_6$ has been investigated in detail as a promising solar material.

The data stored in input dataset 124 may be generated by and/or captured from a variety of sources including one or more sensors of the same or different type, one or more computing devices, etc. One or more columns of data stored in input dataset 124 further may be computed from a value of one or more other variables included in input dataset 124. One or more columns of data stored in input dataset 124 further may be computed using various feature engineering techniques such as principal component analysis to define new features that have been included in input dataset 124. Data stored in input dataset 124 may be received directly or indirectly from the source and may or may not be pre-processed in some manner.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 124 may be captured at different time points periodically, intermittently, when an event occurs, etc. One or more variables of input dataset 124 may include a time and/or a date value. Input dataset 124 may include data captured under normal and/or abnormal operating conditions of the physical object.

Input dataset 124 may be stored on computer-readable medium 108 and/or on one or more computer-readable media of distributed computing system 132 and accessed by model training device 100 using communication interface 106, input interface 102, and/or output interface 104. The data may be organized using delimited fields, such as comma or space separated fields, fixed width fields, etc.

Input dataset 124 may be stored using various data structures as known to those skilled in the art including one or more files of a file system, a relational database, one or more tables of a system of tables, a structured query language database, etc. on model training device 100 and/or on distributed computing system 132 that may be the same or different. Model training device 100 may coordinate access to input dataset 124 that are distributed across distributed computing system 132 that may include one or more computing devices. For example, input dataset 124 may be stored in cubes distributed across a grid of computers as understood by a person of skill in the art. As another example, input dataset 124 may be stored in a multi-node Hadoop® cluster. As another example, input dataset 124 may be stored in a cloud of computers and accessed using cloud computing technologies, as understood by a person of skill in the art.

Figure 2A:
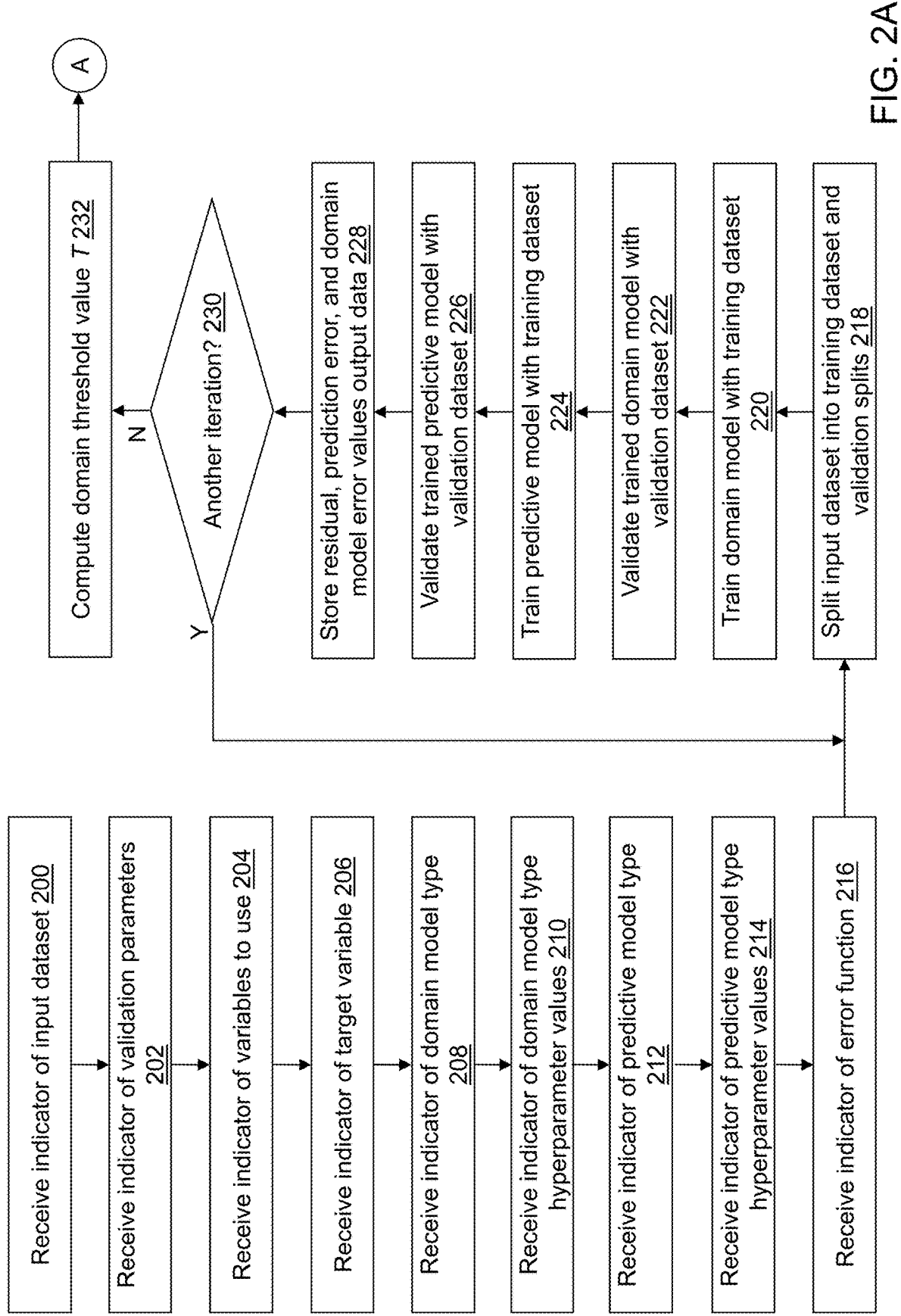
FIGS. 2A and 2B depict a flow diagram illustrating examples of operations performed by the model training device of FIG. 1 in accordance with an illustrative embodiment.
Figure 2B:
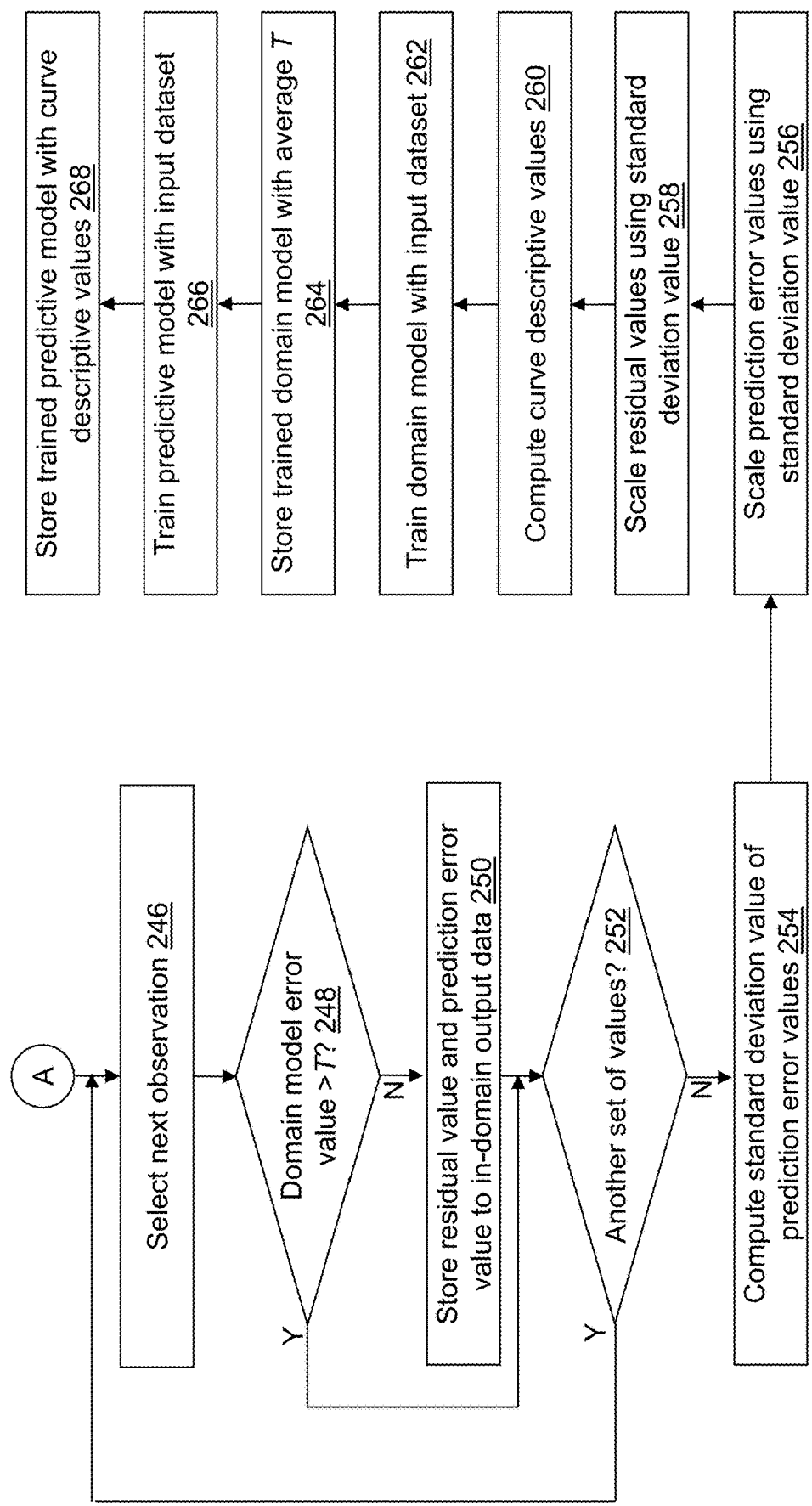

Referring to FIGS. 2A and 2B, example operations associated with training application 122 are described. For example, training application 122 may be used to create predictive model description 128 and domain model description 130 from input dataset 124. Additional, fewer, or different operations may be performed depending on the embodiment of training application 122. The order of presentation of the operations of FIGS. 2A and 2B is not intended to be limiting. Although some of the operational flows are presented in sequence, the various operations may be performed in various repetitions, concurrently (in parallel, for example, using threads and/or distributed computing system 132), and/or in other orders than those that are illustrated. For example, a user may execute training application 122, which causes presentation of a first user interface window, which may include a plurality of menus and selectors such as drop down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122.

Referring to FIG. 2A, in an operation 200, a first indicator may be received that indicates input dataset 124. For example, the first indicator indicates a location and a name of input dataset 124. As an example, the first indicator may be received by training application 122 after selection from a user interface window or after entry by a user into a user interface window. In an alternative embodiment, input dataset 124 may not be selectable. For example, a most recently created dataset may be used automatically. For example, a grid, a cube, a cloud, a Hadoop® cluster, a relational database, a file system, etc. location may be used automatically as a location/name of input dataset 124.

In an operation 202, a second indicator may be received that indicates validation parameters used to define a validation dataset and a training dataset. For example, the second indicator indicates a number of splits F, a number of training/validating iterations, a sampling percentage, and/or a sampling type, used to define how the training dataset and the validation dataset are created from input dataset 124. For example, the second indicator may include the sampling percentage for a fraction of input dataset 124 to be used for training with a remainder to be used for validation. In an alternative embodiment, the second indicator may not be received. For example, a default value may be stored, for example, in computer-readable medium 108 and used automatically. The splits can be created in multiple manners, e.g., with random selection, stratified, or based on properties of the data in input dataset 124.

In an operation 204, a third indicator may be received that indicates a plurality of variables $v_i$ also referred to as features associated with each observation vector included in input dataset 124 to define each observation vector $x_i$, where $i=1, \ldots, N_T$ for input dataset 124. The third indicator may indicate that all or only a subset of the variables stored in input dataset 124 be used to train models stored in predictive model description 128 and domain model description 130. For example, the third indicator indicates a list of variables to use by name, column number, etc. In an alternative embodiment, the third indicator may not be received. For example, all of the variables except the last variable may be used automatically.

In an operation 206, a fourth indicator may be received that indicates a target variable associated with input dataset 124 to define the target variable vector $y_i$, where $i=1, \ldots, N_T$ for input dataset 124. A target variable value may represent or be a label or other value that is considered to result from the associated observation vector values such as a characteristic associated with the observation vector values. For example, the fourth indicator indicates a target variable to use by name, column number, etc. In an alternative embodiment, the fourth indicator may not be received. For example, the last variable in input dataset 124 may be used automatically.

In an operation 208, a fifth indicator of a domain model type to train may be received. For example, the fifth indicator may indicate a name of a domain model type. The fifth indicator may be received by training application 122 after selection from a user interface window or after entry by a user into a user interface window. As an example, the domain model type may be selected from "Gaussian Process Regression", "Kernel Ridge Regression", "Random Forest", "Gradient Boosting Tree", "Linear regression", "Neural Network", "Support Vector Machine", etc. Of course, the domain model type may be labeled or selected in a variety of different manners by the user as understood by a person of skill in the art. In an alternative embodiment, the model type may not be selectable, and a single model type is implemented in training application 122. For example, the Gaussian Process Regression domain model type may be used by default or without allowing a user selection.

In an operation 210, a sixth indicator of hyperparameters value for the domain model type may be received. For example, the sixth indicator may indicate values for one or more domain model hyperparameters based on the domain model type indicated. In an alternative embodiment, the sixth indicator may not be received. For example, default value(s) may be stored, for example, in computer-readable medium 108 and used automatically as the domain model hyperparameters. Though not described herein, a tuning process may be used to select optimal values for the domain model hyperparameters. The sixth indicator may further indicate values for one or more optimization parameters to indicate when training is complete for the domain model type such as a maximum number of configuration evaluations, a maximum number of iterations, a maximum time, etc.

For example, a kernel function may be selectable for the Gaussian Process Regression domain model type in addition to one or more hyperparameters associated with kernel function selected. As an example, a kernel function may be selected from "Gaussian", "Exponential", "Linear", "Polynomial", "Sigmoid", "Radial Basis", etc. Kernel functions may be used in combination, for example, a Gaussian Kernel multiplied by a constant kernel with a white noise kernel added to it. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in training application 122. For example, the Gaussian kernel function may be used by default or without allowing a selection. The Gaussian kernel function may be defined as:

$$\exp\frac{-\|x_i - x_j\|^2}{2s^2}$$

where s is a kernel hyperparameter that is termed a Gaussian bandwidth parameter.

In an operation 212, a seventh indicator of a predictive model type to train may be received. For example, the seventh indicator may indicate a name of a predictive model type. The seventh indicator may be received by training application 122 after selection from a user interface window or after entry by a user into a user interface window. As an example, a predictive model type may be selected from "Random Forest", "Gradient Boosting Tree", "Neural Network", "Support Vector Machine", "Gaussian Process Regression", "Kernel Ridge Regression", etc. Of course, the model type may be labeled or selected in a variety of different manners by the user as understood by a person of skill in the art. In an alternative embodiment, the model type may not be selectable, and a single model type is implemented in training application 122. For example, the Random Forest predictive model type may be used by default or without allowing a user selection.

In an operation 214, an eighth indicator of hyperparameter values for the predictive model type may be received. For example, the eighth indicator may indicate values for one or more predictive model hyperparameters based on the predictive model type indicated. In an alternative embodiment, the eighth indicator may not be received. For example, default value(s) may be stored, for example, in computer-readable medium 108 and used automatically as the predictive model hyperparameters. Though not described herein, a tuning process may be used to select optimal values for the predictive model hyperparameters. The eighth indicator may further indicate values for one or more optimization parameters to indicate when training is complete for the predictive model type such as a maximum number of configuration evaluations, a maximum number of iterations, a maximum time, etc.

In an operation 216, a ninth indicator of an error function for the predictive model type may be received. The error function specifies a measure of model error to be used. The error may be computed from the predictive model by various methods. For example, if the predictive model yields a distribution of values and the error function is the square root of the average of the squared error (RASE) then the error function can be computed from the standard deviation of the distribution. This distribution might come from many sources, for example, the model having an ensemble of learners, whose predictions yield a distribution, or from the model being a Bayesian approach, where the result is a posterior distribution. A default value for the error function may further be stored, for example, in computer-readable medium 108. As an example, an error function may be selected from "ASE", "MAE", "MSE", "MSLE", "RASE", "RMAE", "RMSLE", "RSQ", "RSQRED", etc. ASE uses an average squared error as the error function; MAE uses a mean absolute error as the error function; MSE uses a mean squared error as the error function; MSLE uses a mean squared logarithmic error as the error function; RASE uses a root average squared error as the error function; RMAE uses a root mean absolute error as the error; RMSLE uses a root mean squared logarithmic error as the error function; RSQ uses a fraction of variance of the true value that is predictable from the predicted values as the error function; RSQRED uses a reduced squared error as the error function. Of course, the error function may be labeled or selected in a variety of different manners by the user as understood by a person of skill in the art. In an alternative embodiment, the error function may not be selectable, and a single error function is implemented in training application 122. For example, the "RASE" error function may be used by default or without allowing a selection.

Illustrative error functions may be defined as:

$$ASE = \frac{1}{N_T}\sum_{i=1}^{N_T}(y_i - \hat{y}_i)^2,$$

$$RASE = \sqrt{ASE},$$

$$MSLE = \frac{1}{N_T}\sum_{i=1}^{N_T}(\log(\hat{y}_i + 1) - \log(y_i + 1))^2,$$

$$RMSLE = \sqrt{MSLE},$$

$$MAE = \frac{1}{N_T}\sum_{i=1}^{N_T}|y_i - \hat{y}_i|,$$

$$RMAE = \sqrt{MAE},$$

$$RSQ = \left(\frac{1}{N_T - 1}\frac{1}{\sigma_x \sigma_y}\sum_{i=1}^{N_T}(x_i - \mu_x)(y_i - \mu_y)\right)^2, \text{ and}$$

$$RSQRED = 1 - [(1 - RSQ)(N_T - 1)/(N_T - N_v - 1)],$$

where $\hat{y}_i$ is a predicted target variable value of observation i, $\mu_x$ is a mean vector computed from the observation vectors, $\mu_y$ is a mean target variable vector computed from the target variable vectors, $\sigma_x$ is a standard deviation computed from the observation vectors, and $\sigma_y$ is a standard deviation computed from the target variable vectors.

In an operation 218, input dataset 124 is split into a training dataset and a validation dataset based on the indicators provided in operation 202.

In an operation 220, a domain model of the domain model type indicated in operation 208 is trained using each observation vector read from the training dataset.

In an operation 222, the trained domain model is validated by executing the trained domain model with each observation vector read from the validation dataset. A domain model error value is computed for each observation vector included in the validation dataset.

In an operation 224, a predictive model of the predictive model type indicated in operation 212 is trained using each observation vector read from the training dataset.

In an operation 226, the trained predictive model is validated by executing the trained predictive model with each observation vector read from the validation dataset to predict a target variable value for each observation vector. A prediction error value is computed for each observation vector included in the validation dataset using the error function indicated in operation 216. A residual value is also computed for each observation vector included in the validation dataset. The residual value may be computed as $R(x_i)=\hat{y}_i-y_i$, where $x_i$ is the observation vector, $y_i$ is the true target variable value, and $\hat{y}_i$ is the predicted target variable value, and i is the observation index based, for example, on a row on which a respective observation vector is stored in input dataset 124.

In an operation 228, the prediction error value, the residual value, and the domain model error value computed for each observation vector included in the validation dataset are stored to output data 134. An iteration counter and/or a split counter also may be stored to output data 134.

In operation 230, a determination is made concerning whether or not there is another iteration of the number of training/validating model iterations. When there is another iteration, processing continues in operation 218. When there is not another iteration, processing continues in an operation 232.

In operation 232, a domain threshold value T is computed, and processing continues in an operation 246 shown referring to FIG. 2B. Domain threshold value T can be computed using any aspect of the domain model or both the domain and prediction models. Domain threshold value T can also be a function of the features used in the prediction model. In an alternative embodiment, domain threshold value T may be computed as a predefined percentage of a summed domain model error value computed from the domain model error values stored to output data 134 in operation 228.

Referring to FIG. 2B, in operation 246, a next set of values is selected from output data 134. For example, on a first iteration of operation 246, a first set of values is selected from a first row of output data 134; on a second iteration of operation 246, a second observation having an observation index of two is selected from a second row of output data 134; and so on.

In an operation 248, a determination is made concerning whether the average domain model error included in the next set of values is greater than the computed domain threshold value T. When the average domain model error is greater than T, processing continues in an operation 252 to skip the set of values as out-of-domain. When the average domain model error is less than or equal to T, processing continues in an operation 250.

In operation 250, the prediction error value and the residual value included in the next set of values are stored to in-domain output data 136.

In operation 252, a determination is made concerning whether there is another set of values included in output data 134. When there is another set of values, processing continues in operation 246 to select a next set of values. When there is not another set of values, processing continues in an operation 254.

In operation 254, a standard deviation value is computed between a mean value computed from a total prediction error value computed from each prediction error value stored in in-domain output data 136 and each prediction error value stored in in-domain output data 136.

In an operation 256, each prediction error value stored in in-domain output data 136 is divided by the computed standard deviation value to scale the prediction error values.

In an operation 258, each residual value stored in in-domain output data 136 is divided by the computed standard deviation value to scale the residual values.

In an operation 260, curve descriptive values are computed based on a type of curve to define a relationship between the residual values as a function of the prediction error values for the in-domain data. For example, in an illustrative embodiment, the type of curve is a line, and the curve descriptive values are a slope value and a y-intercept value. In another illustrative embodiment, the type of curve is a polynomial of a defined degree, and the curve descriptive values are coefficients of the polynomial.

In an illustrative embodiment, the curve descriptive values are computed using binned error values and bin count values computed from the scaled prediction error values, and binned residual values are computed from the scaled residual values. For example, a predefined number of bins, a maximum prediction error value computed from the scaled prediction error values, and a minimum prediction error value computed from the scaled prediction error values may be used to define a bin minimum value and a bin maximum value for each bin of a plurality of bins. A number of the plurality of bins is the predefined number of bins. The bin count values are a count of a number of prediction error values stored in in-domain output data 136 that have scaled prediction error values that fall within the bin minimum value and the bin maximum value of each respective bin. The binned error values are the scaled prediction error values for the prediction error values stored in in-domain output data 136 that have scaled prediction error values that fall within the bin minimum value and the bin maximum value of each bin. The binned residual values are a root mean squared of the scaled residual values for residual values stored in in-domain output data 136 that have scaled prediction error values that fall within the bin minimum value and the bin maximum value of each respective bin. A curve is fit to the binned residual values as a function of the binned error values to define curve descriptive values based on the type of curve. For a line curve type, the linear fit may be weighted by the number of points in each bin.

In another illustrative embodiment, values of the curve descriptive values such as the slope value and the y-intercept value for the line that optimize the mean and standard deviation of the r-statistic distribution for the scaled residual values and scaled prediction errors are found directly so that they are close to 0 and 1, respectively. The r-statistic is a ratio of scaled residual values to the scaled prediction error values. A predefined objective function such as $F(a,b)=\mu^2+(\sigma-1)^2$ is optimized, where $\mu$ and $\sigma$ are the mean and standard deviation of the distribution of $r/(a*e+b)$ for the prediction error values stored in in-domain output data 136, where a is the slope value, b is the y-intercept value, r is the scaled residual value, and e is the scaled prediction error value. Using a standard optimization algorithm, such as the Nelder-Mead algorithm, the values of a and b that minimize F can be determined. The initial values of 1.0 and 0.0 for a and b may be used as input to the algorithm.

In yet another illustrative embodiment, values of the curve descriptive values such as the slope value and the y-intercept value for the line that optimize the mean and standard deviation for the scaled error estimates are found directly so that they are close to 0 and 1, respectively, using a log-likelihood function. The values of the slope value a and the y-intercept value b can be found by minimizing a sum of the negative log likelihoods that each residual $R(x_i)=\hat{y}_i-y_i$, $i=1, \ldots, N$, where N is a number of prediction error values stored in in-domain output data 136, was drawn from a normal distribution with a mean of 0 and a standard deviation of $\sigma_{cal_i}=a\sigma_{uc_i}+b$, where $\sigma_{uc_i}$ is an uncalibrated predicted error, and $\sigma_{cal_i}$ is a calibrated predicted error. For a single point, this leads to a probability density function of the normal distribution:

$$f(R(x_i)) = \frac{1}{(a\sigma_{uc_i}+b)\sqrt{2\pi}} e^{-1/2\left(\frac{R(x_i)}{a\sigma_{uc_i}+b}\right)^2}$$

Multiplying these together for all $x_i$, the likelihood function is:

$$L(a, b \mid \sigma_{uc_1}, \ldots, \sigma_{uc_n}, R(x_1), \ldots, R(x_N)) =$$

$$\prod_{i=1}^{N} \frac{1}{(a\sigma_{uc_i} + b)\sqrt{2\pi}} e^{-\frac{1}{2}\left(\frac{R(x_i)}{a\sigma_{uc_i}+b}\right)^2}.$$

To find a maximum of the above function, the natural log can be taken to yield the log-likelihood function. Maximizing the log-likelihood function is equivalent to maximizing the likelihood function, but is computationally much more feasible since it involves a sum instead of a product:

$$LL(a, b \mid \sigma_{uc_1}, \ldots, \sigma_{uc_n}, R(x_1), \ldots, R(x_N)) =$$

$$\sum_{i=1}^{N} \ln\left(\frac{1}{(a\sigma_{uc_i} + b)\sqrt{2\pi}} e^{-\frac{1}{2}\left(\frac{R(x_i)}{a\sigma_{uc_i}+b}\right)^2}\right).$$

Simplifying this expression, multiplying by 2, and flipping the sign for clarity, a simplified expression for the negative log-likelihood is:

$$NLL(a, b \mid \sigma_{uc_1}, \ldots, \sigma_{uc_n}, R(x_1), \ldots, R(x_N)) =$$

$$\sum_{i=1}^{N} \ln 2\pi + \ln(a\sigma_{uc_i} + b)^2 + \frac{R(x)^2}{(a\sigma_{uc_i} + b)^2}.$$

Using this, the maximum likelihood estimate for a and b can be obtained by minimizing the negative log-likelihood. That is, letting $D_{cv}$ be the residual values stored in in-domain output data 136, the optimization problem $$a, b = \operatorname{argmin}_{a',b'} \sum_{x_i, y \in D_{cv}} \ln 2\pi + \ln(a'\hat{\sigma}_{uc}(x) + b')^2 + \frac{R(x)^2}{(a'\hat{\sigma}_{uc}(x) + b')^2}$$

is solved, for example, using the Nelder-Mead optimization algorithm.

In an operation 262, a domain model of the domain model type indicated in operation 208 is trained using each observation vector included in input dataset 124.

In an operation 264, the parameters that describe the trained domain model may be stored in computer-readable medium 108. For example, the parameters may be stored in domain model description 130. The domain threshold value T computed in operation 232 also may be stored in domain model description 130.

In an operation 266, a predictive model of the predictive model type indicated in operation 212 is trained using each observation vector included in input dataset 124.

In an operation 268, the parameters that describe the trained predictive model may be stored in computer-readable medium 108 with the curve descriptive values. For example, the parameters may be stored in predictive model description 128. The type of curve and the values associated with the type of curve are stored as the curve descriptive values.

Figure 3:
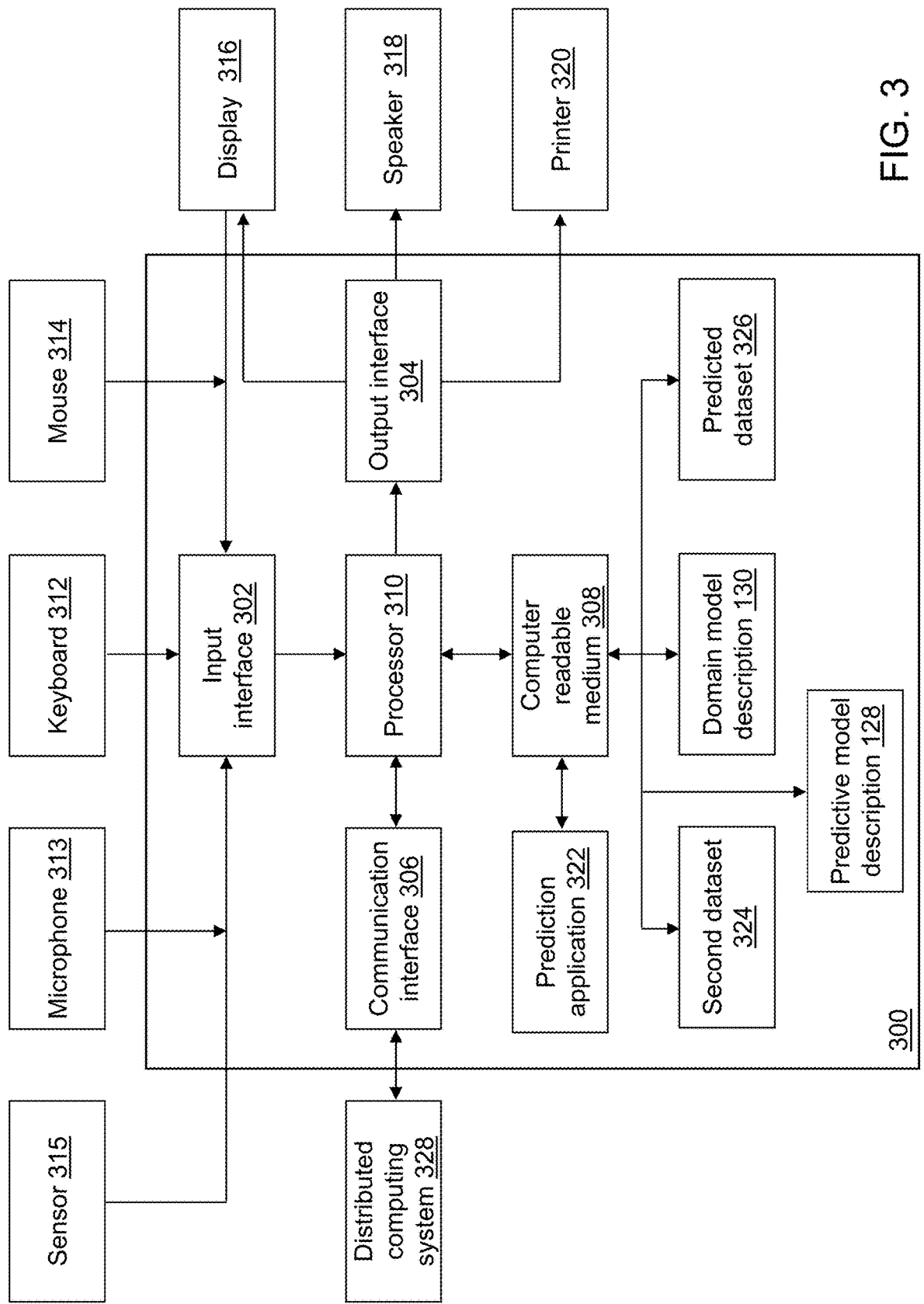
FIG. 3 depicts a block diagram of a prediction device in accordance with an illustrative embodiment.

Referring to FIG. 3, a block diagram of a prediction device 300 is shown in accordance with an illustrative embodiment. Prediction device 300 may include a second input interface 302, a second output interface 304, a second communication interface 306, a second non-transitory computer-readable medium 308, a second processor 310, a prediction application 322, predictive model description 128, domain model description 130, second dataset 324, and predicted dataset 326. Fewer, different, and/or additional components may be incorporated into prediction device 300. Prediction device 300 and model training device 100 may be the same or different devices.

Second input interface 302 provides the same or similar functionality as that described with reference to input interface 102 of model training device 100 though referring to prediction device 300. Second output interface 304 provides the same or similar functionality as that described with reference to output interface 104 of model training device 100 though referring to prediction device 300. Second communication interface 306 provides the same or similar functionality as that described with reference to communication interface 106 of model training device 100 though referring to prediction device 300. Data and messages may be transferred between prediction device 300 and distributed computing system 132 using second communication interface 306. Second computer-readable medium 308 provides the same or similar functionality as that described with reference to computer-readable medium 108 of model training device 100 though referring to prediction device 300. Second processor 310 provides the same or similar functionality as that described with reference to processor 110 of model training device 100 though referring to prediction device 300.

Prediction application 322 performs operations associated with classifying or predicting a characteristic from data stored in second dataset 324 that may be stored in predicted dataset 326 to support various data analysis functions as well as provide alert/messaging related to the classified/predicted data. Dependent on the type of data stored in input dataset 124 and in second dataset 324, prediction application 322 may identify anomalies as part of process control, for example, of a manufacturing process, for machine condition monitoring, for example, an electro-cardiogram device, for image classification, for intrusion detection, for fraud detection, for materials property identification, etc. Some or all of the operations described herein may be embodied in prediction application 322. The operations may be implemented using hardware, firmware, software, or any combination of these methods.

Prediction application 322 may be integrated with other system processing tools to automatically process data generated as part of operation of an enterprise, device, system, facility, etc., to identify any outliers (out-of-domain observation vectors) in the processed data, to monitor changes in the data, and to provide a warning or alert associated with the monitored data using second input interface 302, second output interface 304, and/or second communication interface 306 so that appropriate action can be initiated in response to changes in the monitored data. For example, a warning or an alert may be presented using a second display 316, a second speaker 318, a second printer 320, etc. or sent to one or more computer-readable media, display, speaker, printer, etc. of distributed computing system 132.

Referring to the example embodiment of FIG. 3, prediction application 322 is implemented in software (comprised of computer-readable and/or computer-executable instructions) stored in second computer-readable medium 308 and accessible by second processor 310 for execution of the instructions that embody the operations of prediction application 322. Prediction application 322 may be written using one or more programming languages, assembly languages, scripting languages, etc. Prediction application 322 may be integrated with other analytic tools including training application 122. Prediction application 322 may be implemented as a Web application.

Input dataset 124 and second dataset 324 may be generated, stored, and accessed using the same or different mechanisms. Similar to input dataset 124, second dataset 324 may include a plurality of rows and a plurality of columns with the plurality of rows referred to as observations or records, and the columns referred to as variables that are associated with an observation. Second dataset 324 may be transposed. Unlike input dataset 124, second dataset 324 does not include a target variable value. Instead, prediction application 322 predicts a value for the target variable value using the trained predictive model stored in predictive model description 128.

Similar to input dataset 124, second dataset 324 may be stored on second computer-readable medium 308 or on one or more computer-readable media of distributed computing system 132 and accessed by prediction device 300 using second communication interface 306. Data stored in second dataset 324 may be a sensor measurement or a data communication value, for example, from a sensor 315, may be generated or captured in response to occurrence of an event or a transaction, generated by a device such as in response to an interaction by a user with the device, for example, from a second keyboard 312, a second microphone 313, or a second mouse 314, etc.

The data stored in second dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 324 may be captured at different time points periodically, intermittently, when an event occurs, etc. One or more columns may include a time value.

Similar to input dataset 124, second dataset 324 may be stored using various structures as known to those skilled in the art including a file system, a relational database, a system of tables, a structured query language database, etc. on prediction device 300 and/or on distributed computing system 132. Prediction device 300 and/or distributed computing system 132 may coordinate access to second dataset 324 that is distributed across a plurality of computing devices that make up distributed computing system 132. For example, second dataset 324 may be stored in a cube distributed across a grid of computers as understood by a person of skill in the art. As another example, second dataset 324 may be stored in a multi-node Hadoop cluster. As another example, second dataset 324 may be stored in a cloud of computers and accessed using cloud computing technologies, as understood by a person of skill in the art.

Figure 4:
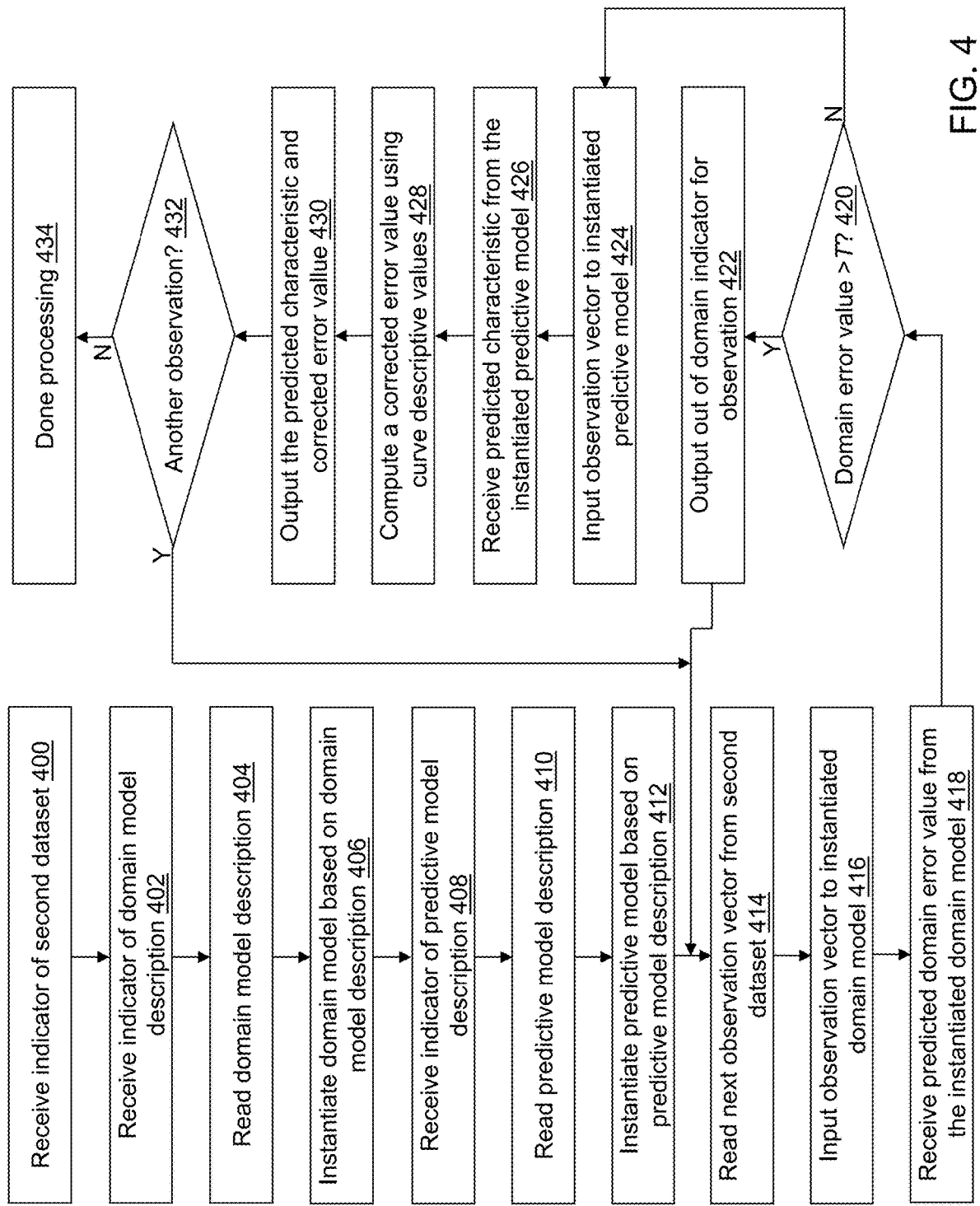
FIG. 4 depicts a flow diagram illustrating examples of operations performed by the prediction device of FIG. 3 in accordance with an illustrative embodiment.

Referring to FIG. 4, example operations of prediction application 322 are described. Additional, fewer, or different operations may be performed depending on the embodiment of prediction application 322. The order of presentation of the operations of FIG. 4 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 400, a tenth indicator may be received that indicates second dataset 324. For example, the tenth indicator indicates a location and a name of second dataset 324. As an example, the tenth indicator may be received by prediction application 322 after selection from a user interface window or after entry by a user into a user interface window. In an alternative embodiment, second dataset 324 may not be selectable. For example, a most recently created dataset may be used automatically.

In an operation 402, an eleventh indicator may be received that indicates domain model description 130. For example, the eleventh indicator indicates a location and a name of domain model description 130. As an example, the eleventh indicator may be received by prediction application 322 after selection from a user interface window or after entry by a user into a user interface window. In an alternative embodiment, domain model description 130 may not be selectable. For example, a most recently created model description may be used automatically. As another example, domain model description 130 may be provided automatically as part of integration with training application 122.

In an operation 404, the parameters that describe the trained domain model based on the model type are read from domain model description 130 including an indication of which variables of second dataset 324 to input to the model and the hyperparameter values to use. The domain threshold value T further may be read from domain model description 130 or otherwise provided as an input value to prediction application 322.

In an operation 406, a domain model is instantiated using the read domain model description.

In an operation 408, a twelfth indicator may be received that indicates predictive model description 128. For example, the twelfth indicator indicates a location and a name of predictive model description 128. As an example, the twelfth indicator may be received by prediction application 322 after selection from a user interface window or after entry by a user into a user interface window. In an alternative embodiment, predictive model description 128 may not be selectable. For example, a most recently created model description may be used automatically. As another example, predictive model description 128 may be provided automatically as part of integration with training application 122.

In an operation 410, the parameters that describe the trained predictive model based on the model type are read from predictive model description 128 including an indication of which variables of second dataset 324 to input to the model and the hyperparameter values to use. The curve descriptive values that include the type of curve and its associated parameters, such as the slope value and the y-intercept value for a line curve type or the polynomial coefficients for a polynomial curve type, further may be read from predictive model description 128 or otherwise provided as input values to prediction application 322.

In an operation 412, a predictive model is instantiated using the read predictive model description.

In an operation 414, an observation vector is read from second dataset 324.

In an operation 416, the observation vector is input to the instantiated domain model.

In an operation 418, a predicted domain error value computed by the instantiated domain model is received.

In an operation 420, a determination is made concerning whether the computed predicted domain error value is greater than the domain threshold value T. When the average domain model error is greater than T, processing continues in an operation 422. When the average domain model error is less than or equal to T, processing continues in an operation 424.

In operation 422, an out-of-domain or an outlier indicator may be output to predicted dataset 326, presented on second display 316, etc. to notify the user of the occurrence of the outlier, and processing continues in operation 414. In alternative embodiments, processing continues in operation 414 with no indicator output.

In operation 424, the observation vector is input to the instantiated predictive model.

In an operation 426, a predicted characteristic computed by the instantiated predictive model and a predicted error value associated with the predicted characteristic is received. The predicted error value is computed based on the error function indicated in operation 216.

In an operation 428, a corrected error value is computed using the curve descriptive values. For example, the corrected error value is computed by multiplying the computed predicted error value by the slope value and adding the y-intercept value for a line curve type. As another example, the corrected error value is computed using an equation defined by the polynomial coefficients defined for a polynomial curve type.

In an operation 430, the predicted characteristic and the corrected error value may be output, for example, by storing the predicted characteristic and the corrected error value with the observation vector to predicted dataset 326. In addition, or in the alternative, the predicted characteristic and the corrected error value may be presented on second display 316, printed on second printer 320, sent to another computing device using second communication interface 306, an alarm or other alert signal may be sounded through second speaker 318, etc.

In an operation 432, a determination is made concerning whether or not second dataset 324 includes another observation vector. When second dataset 324 includes another observation vector, processing continues in operation 414. When second dataset 324 does not include another observation vector, processing continues in an operation 434.

In operation 434, processing stops and cleanup is performed as needed.

Figure 5:
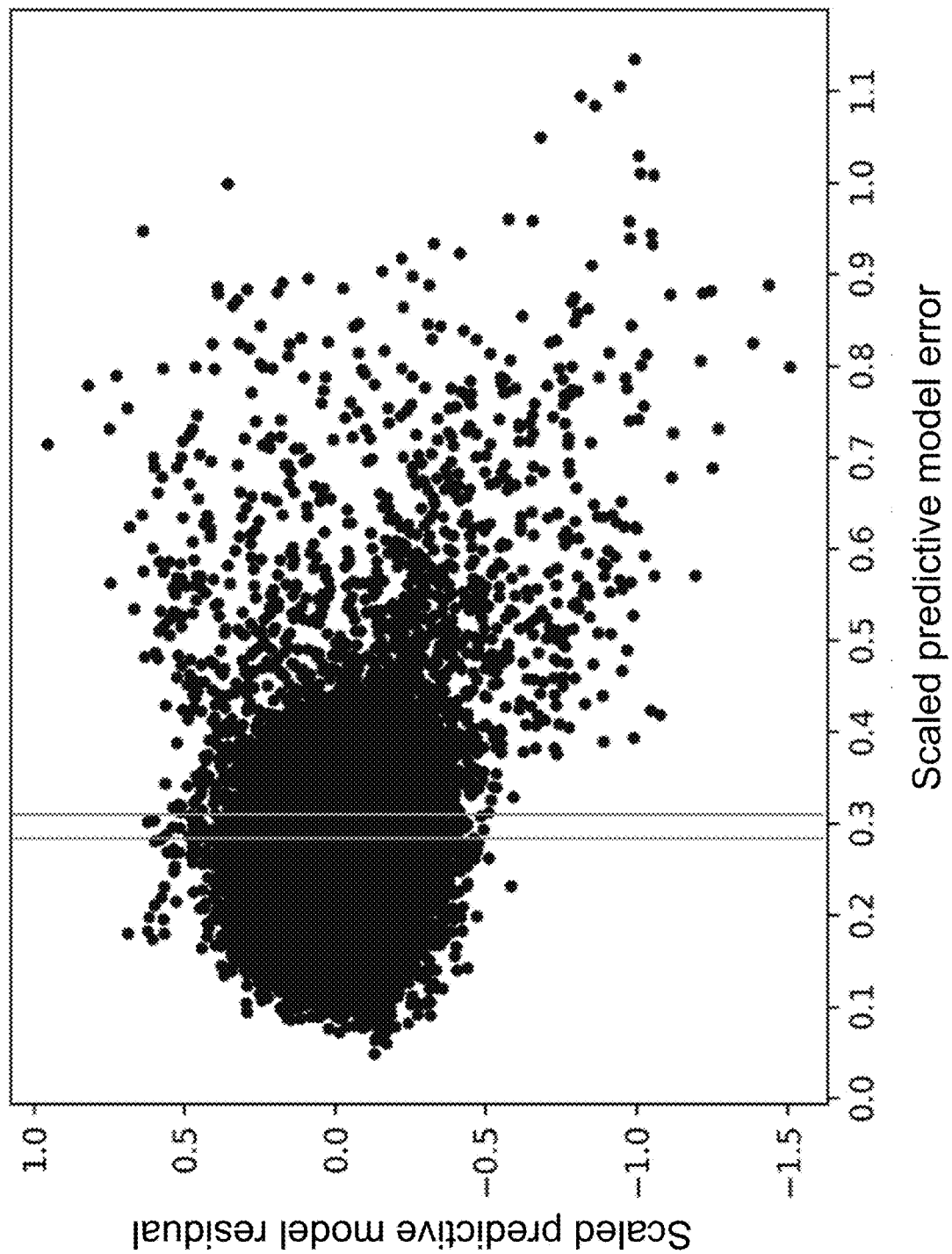
FIG. 5 depicts a graph of a predictive model residual as a function of a predictive model error for a first dataset in accordance with an illustrative embodiment.
Figure 6:
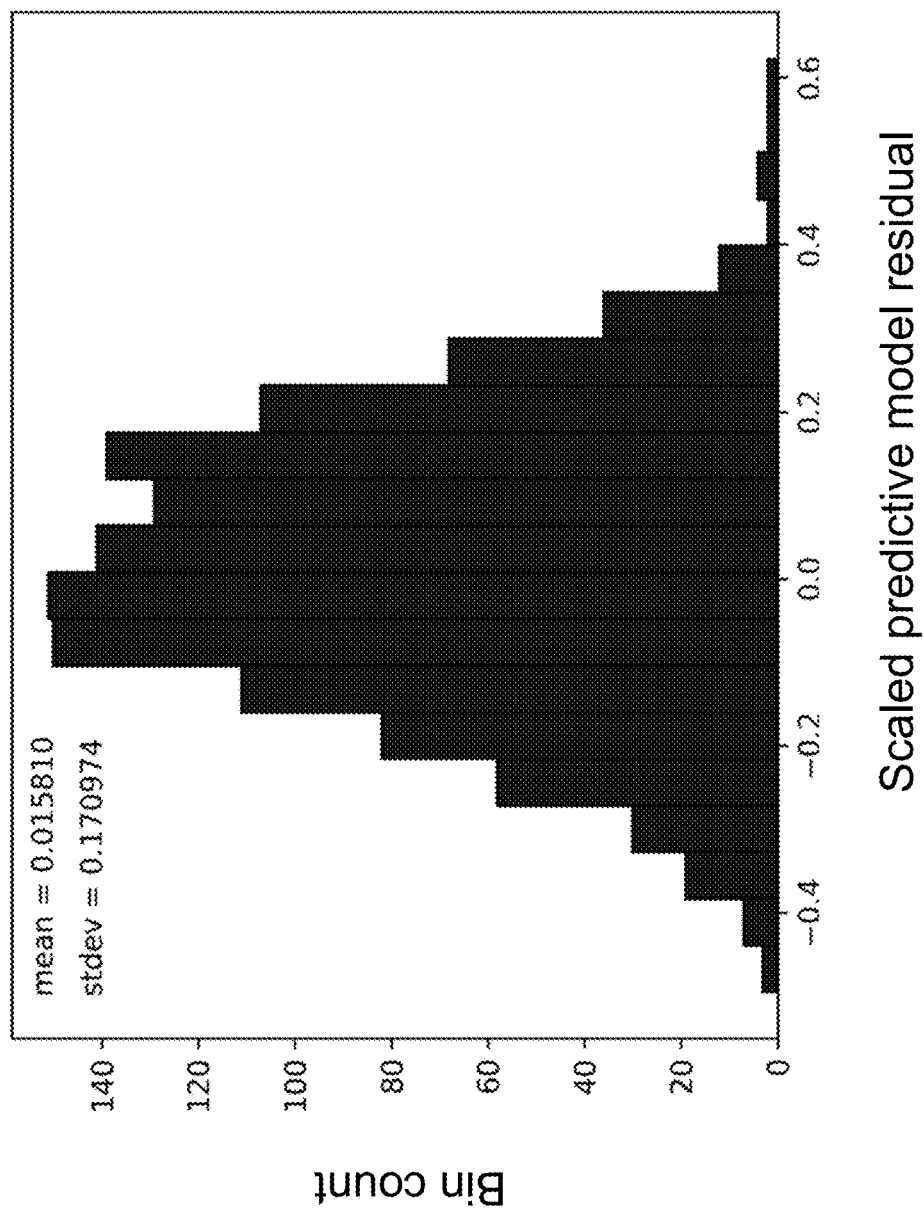
FIG. 6 depicts a histogram of the predictive model residual of FIG. 5 in accordance with an illustrative embodiment.
Figure 7:
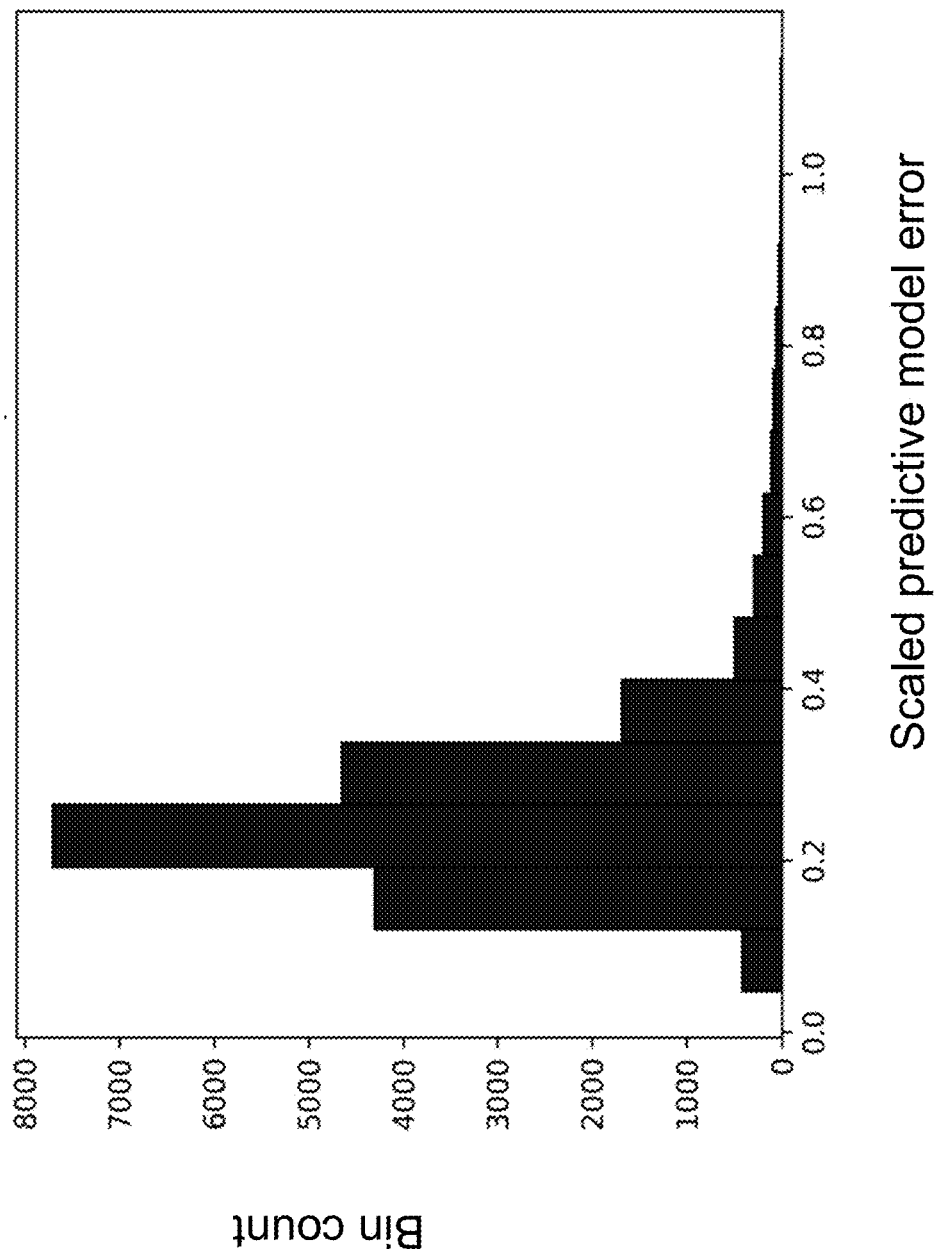
FIG. 7 depicts a histogram of the predictive model error of FIG. 5 in accordance with an illustrative embodiment.

Referring to FIG. 5, a graph of a predictive model residual as a function of a predictive model error for a first dataset is shown in accordance with an illustrative embodiment. The first dataset was generated by a function, $y=30 \sin(4\pi x_0 x_1) + 20(x_2-0.5)^2 + 10x_3 + 5x_4$. All x-values were drawn uniformly at random from the range [0,0.5]. The predictions y were made using 5-split 80/20 cross-validation splits, repeated 100 times to give a total of 20,000 predictions. Referring to FIG. 6, a residual histogram of the predictive model residuals for a random forest machine learning model corresponding to uncertainty estimates between 0.29 and 0.31 are shown for the first dataset in accordance with an illustrative embodiment. For the slice of predictions indicated by the vertical lines in FIG. 5, the distribution of residuals is expected to have a standard deviation of roughly 0.3 because the error estimates for that slice are all close to 0.3. However, the actual standard deviation was only 0.17 indicating a scaling error in the error estimates. The predictive model residuals were scaled with the standard deviation. Referring to FIG. 7, a model error histogram of the predictive model error for the random forest machine learning model are shown for the first dataset in accordance with an illustrative embodiment. The predictive model residuals were scaled with the standard deviation. 20 bins were used to create the histogram in FIG. 6. 15 bins were used to create the histogram in FIG. 7.

Figure 8:
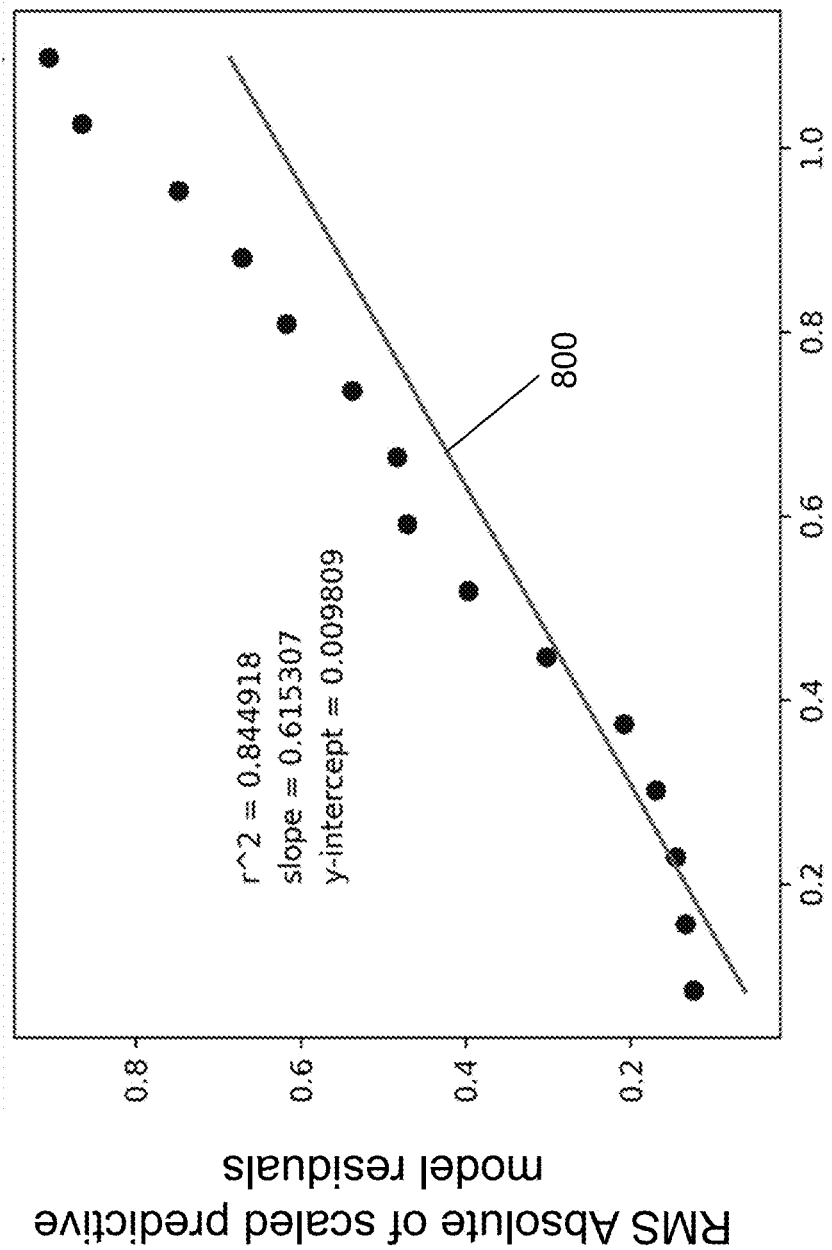
FIG. 8 depicts a scatter plot of a root mean squared predictive model residual as a function of a binned predictive model error for the first dataset and a line fit to the scatter plot values in accordance with an illustrative embodiment.

Referring to FIG. 8, a scatter plot of a root mean squared predictive model residual as a function of a binned predictive model error for the first dataset is shown with a line fit to the scatter plot values in accordance with an illustrative embodiment. The fit was weighted by the number of points in each bin. A slope value of 0.615307, a y-intercept value of 0.009809, and an $r^2$ value of 0.844918 was computed for a first fit line 800. No correction was performed and no out-of-domain observations were removed.

Figure 9:
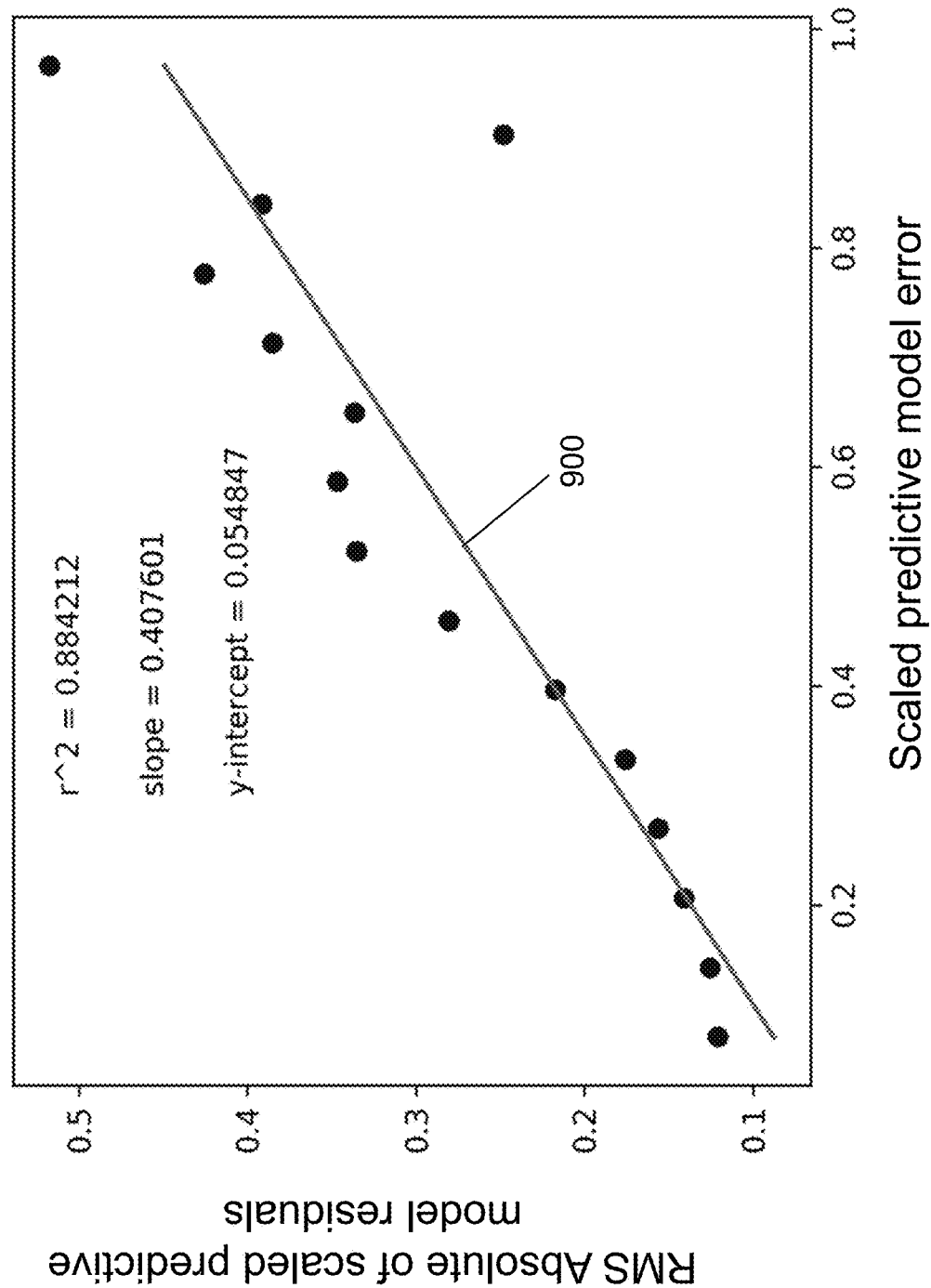
FIG. 9 depicts a scatter plot of the root mean squared predictive model residual as a function of the binned predictive model error for the first dataset and the line fit to the scatter plot values of FIG. 8 after removing out of domain observation vectors in accordance with an illustrative embodiment.

Referring to FIG. 9, a scatter plot of the root mean squared predictive model residual as a function of the binned predictive model error for the first dataset and the line fit to the scatter plot values of FIG. 8 after removing out of domain observation vectors are shown in accordance with an illustrative embodiment. The fit was weighted by the number of points in each bin. A slope value of 0.407601, a y-intercept value of 0.054847, and an $r^2$ value of 0.884212 was computed for a second fit line 900.

Figure 10:
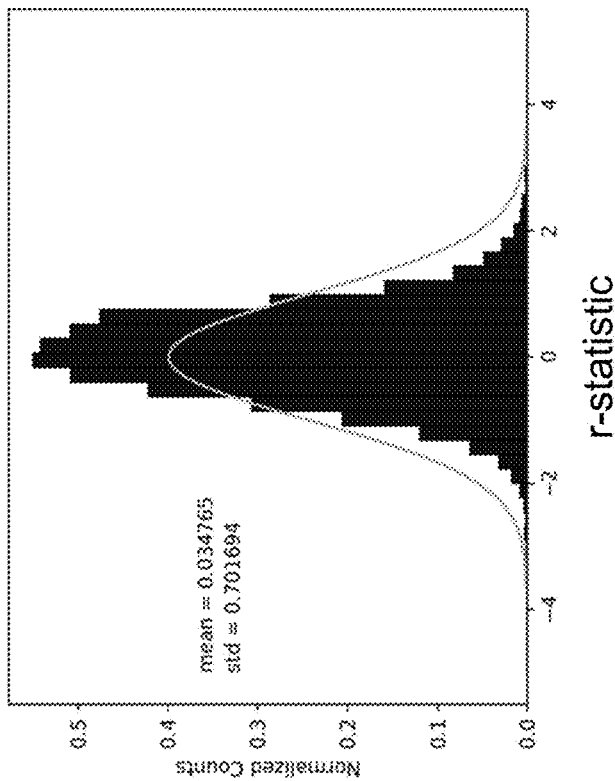
FIG. 10 depicts a histogram of an r-statistic for the first dataset in accordance with an illustrative embodiment.

Referring to FIG. 10, a first histogram of an r-statistic for the first dataset is shown in accordance with an illustrative embodiment. The r-statistic is a ratio of the predictive model residuals to the predictive model error values. If the predictive model error values truly represent a standard deviation, for an unbiased model, the r-statistic distribution should be normally distributed with mean 0 and standard deviation 1. A first probability distribution function (PDF) curve 1100 was fit to the first histogram. The predictive model error resulted in a mean value of −0.021457 and a standard deviation value of 0.623666.

Figure 11:
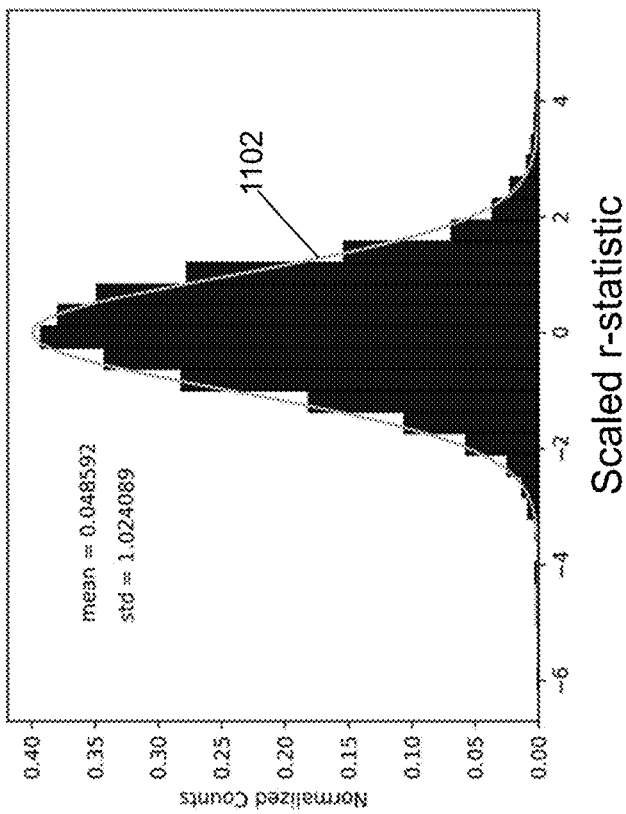
FIG. 11 depicts a histogram of the r-statistic of FIG. 10 after correcting the predictive model error in accordance with an illustrative embodiment.

Referring to FIG. 11, a second histogram of the r-statistic of FIG. 11A after correcting the predictive model error is shown in accordance with an illustrative embodiment. A second PDF curve 1102 was fit to the second histogram. Correcting the predictive model error resulted in a mean value of −0.036254 and a standard deviation value of 0.995495. The standard deviation value was closer to one.

Figure 12:
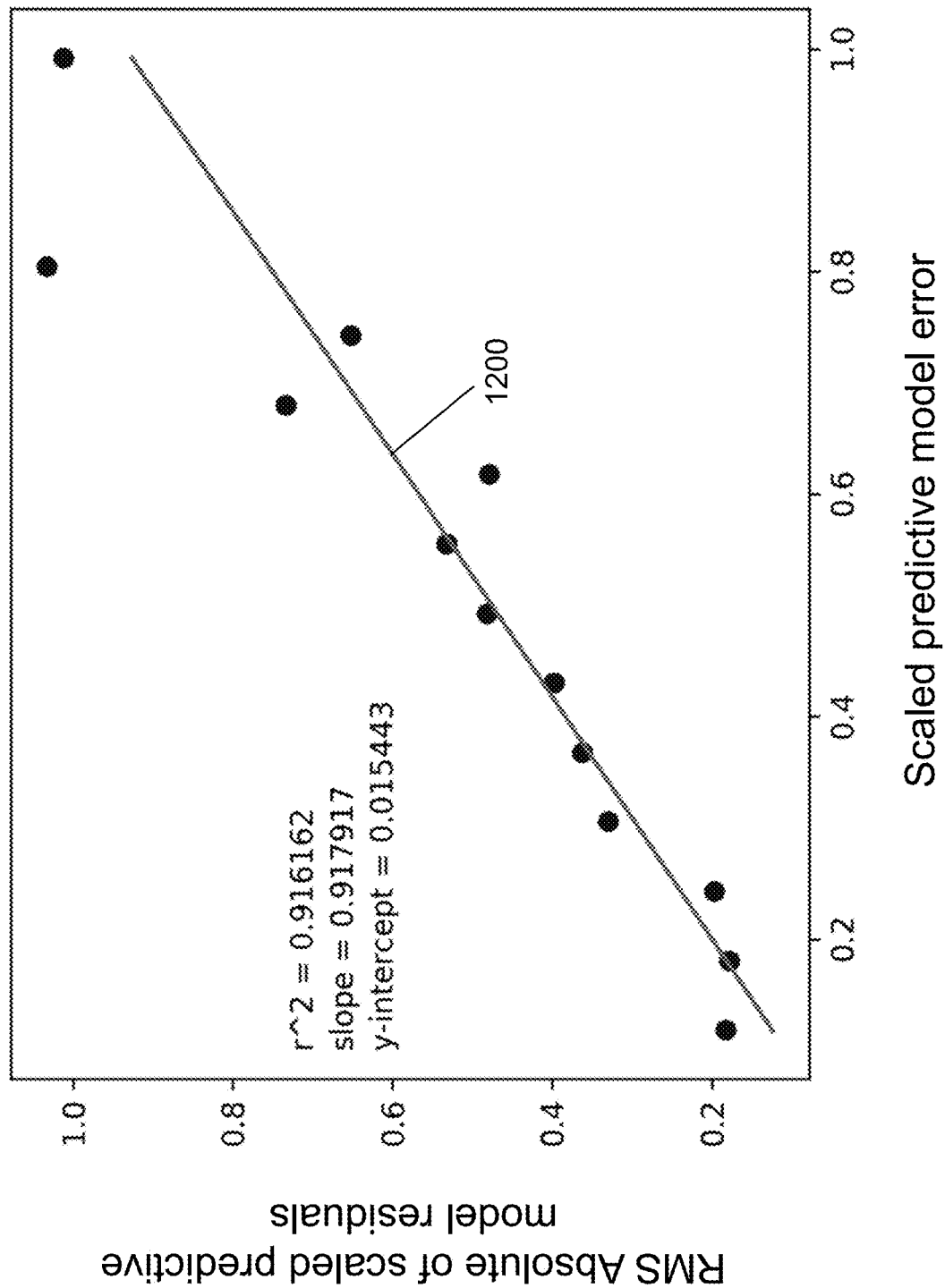
FIG. 12 depicts a scatter plot of the root mean squared predictive model residual as a function of the binned predictive model error for a second dataset and the line fit to the scatter plot values after correcting the predictive model error in accordance with an illustrative embodiment.

Referring to FIG. 12, a scatter plot of the root mean squared predictive model residual as a function of the binned predictive model error for a second dataset and the line fit to the scatter plot values after correcting the predictive model error in accordance with an illustrative embodiment. The second dataset is described in Lu, H. J., Zou, N., Jacobs, R., Afflerbach, B., Lu, X. G. & Morgan, D., Error assessment and optimal cross-validation approaches in machine learning applied to impurity diffusion Computational Materials Science 169, 109075 (2019). DOI: 10.1016/j.commatsci.2019.06.010. The fit was weighted by the number of points in each bin. A slope value of 0.884347, a y-intercept value of −0.012532, and an $r^2$ value of 0.989622 was computed for a fourth fit line 1200.

Figure 13A:
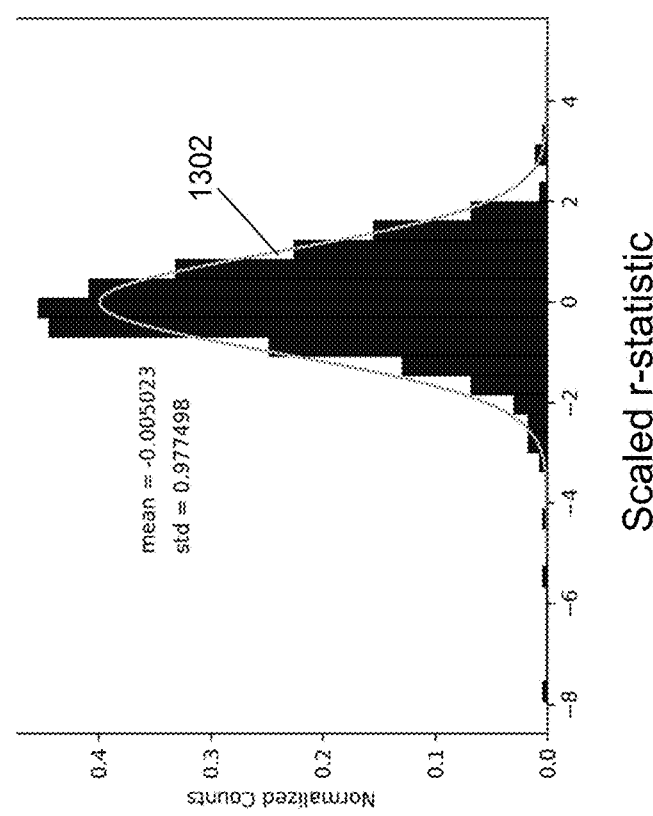
FIG. 13A depicts a histogram of an r-statistic for the second dataset in accordance with an illustrative embodiment.

Referring to FIG. 13A depicts a third histogram of an r-statistic for the second dataset in accordance with an illustrative embodiment. A third PDF curve 1300 was fit to the third histogram. The predictive model error resulted in a mean value of −0.02609 and a standard deviation value of 0.817023.

Figure 13B:
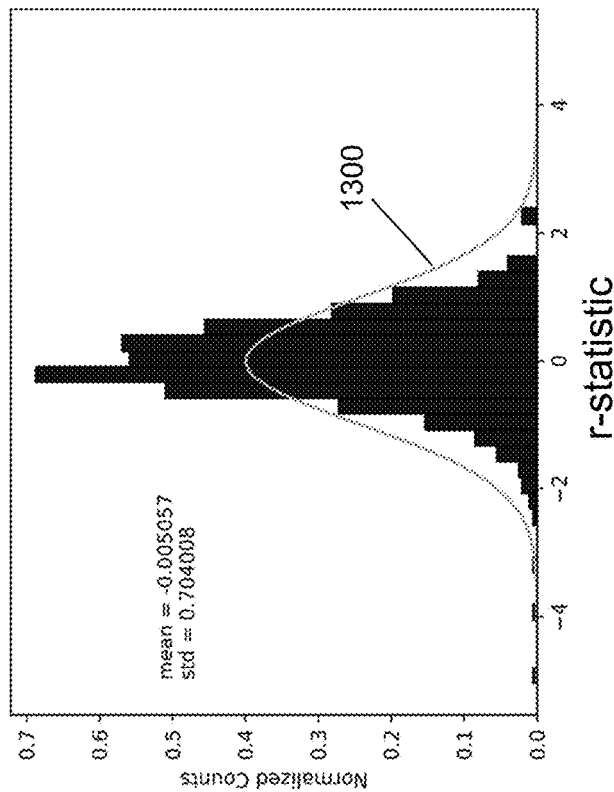
FIG. 13B depicts a histogram of the r-statistic of FIG. 13A after correcting the predictive model error in accordance with an illustrative embodiment.

Referring to FIG. 13B depicts a fourth histogram of the r-statistic of FIG. 13A after correcting the predictive model error in accordance with an illustrative embodiment. A fourth PDF curve 1302 was fit to the fourth histogram. The predictive model error resulted in a mean value of −0.030861 and a standard deviation value of 0.938582.

Figure 14:
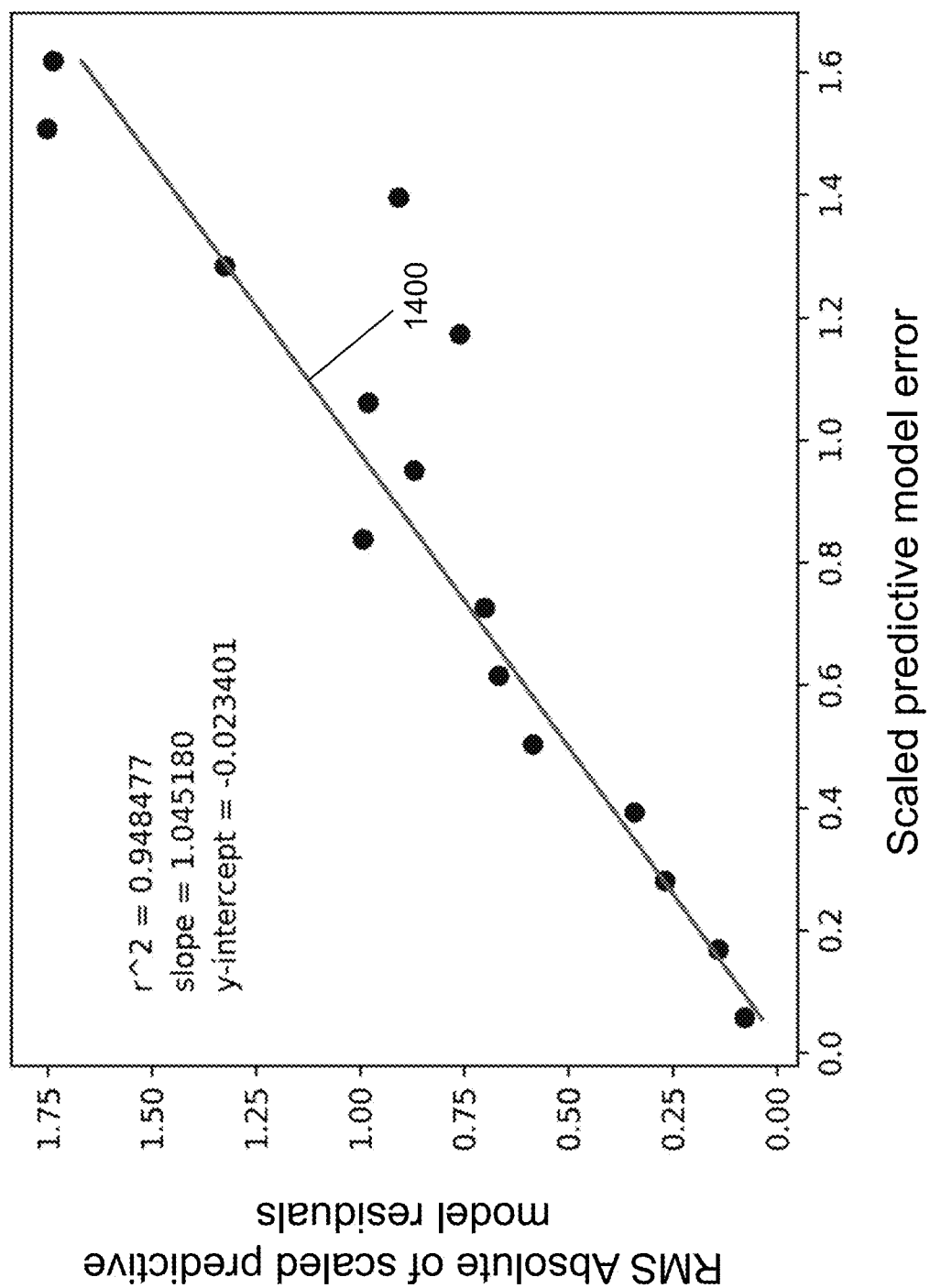
FIG. 14 depicts a scatter plot of the root mean squared predictive model residual as a function of the binned predictive model error for a third dataset and the line fit to the scatter plot values after correcting the predictive model error in accordance with an illustrative embodiment.

Referring to FIG. 14, a scatter plot of the root mean squared predictive model residual as a function of the binned predictive model error for a third dataset and the line fit to the scatter plot values after correcting the predictive model error are shown in accordance with an illustrative embodiment. The third dataset is described in Li, W., Jacobs, R. & Morgan, D., Predicting the thermodynamic stability of perovskite oxides using machine learning models, Computational Materials Science 150, 454-463 (2018). DOI: 10.1016/j.commatsci.2018.04.033. The fit was weighted by the number of points in each bin. A slope value of 0.612589, a y-intercept value of 0.040965, and an $r^2$ value of 0.964062 was computed for a fifth fit line 1400.

Figure 15A:
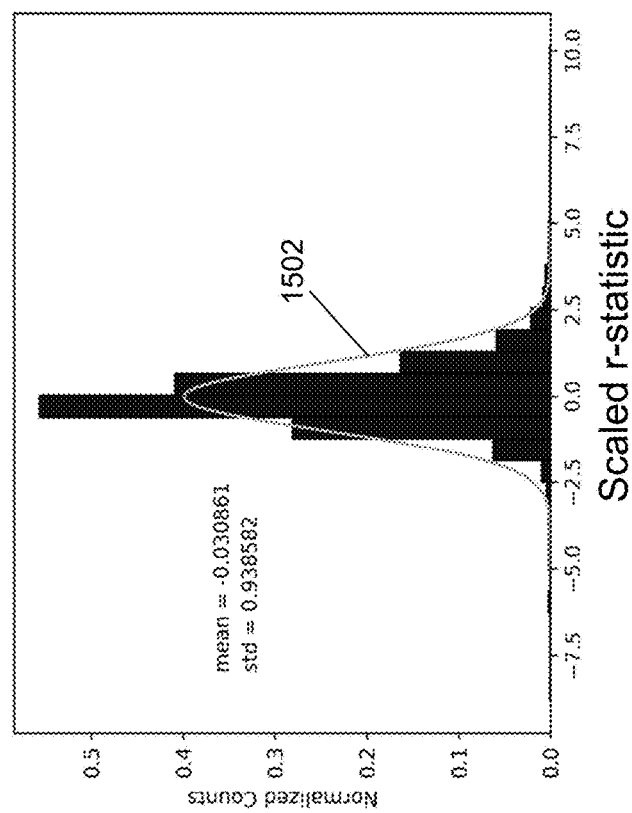
FIG. 15A depicts a histogram of an r-statistic for the third dataset in accordance with an illustrative embodiment.

Referring to FIG. 15A, a fifth histogram of an r-statistic for the third dataset is shown in accordance with an illustrative embodiment. A fifth PDF curve 1500 was fit to the fifth histogram. The predictive model error resulted in a mean value of −0.005023 and a standard deviation value of 0.977498.

Figure 15B:
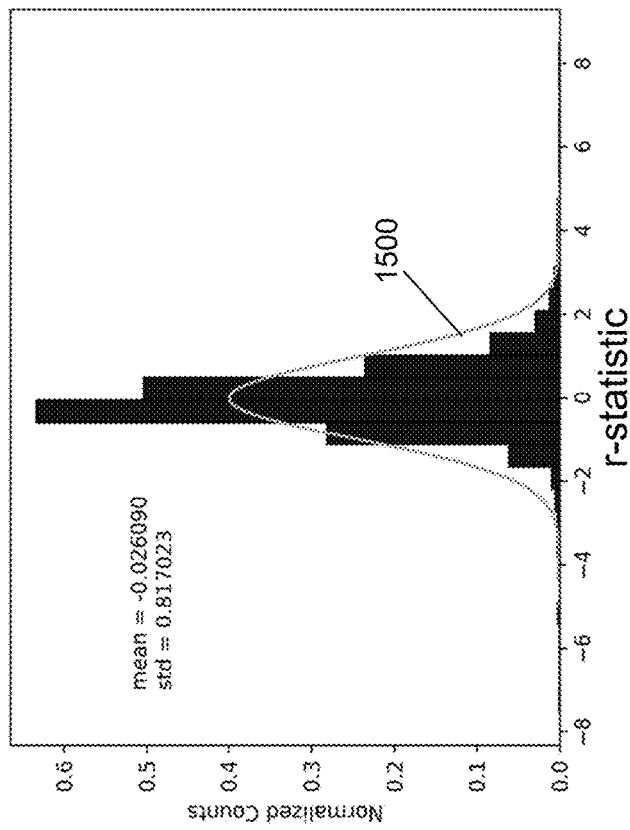
FIG. 15B depicts a histogram of the r-statistic of FIG. 15A after correcting the predictive model error in accordance with an illustrative embodiment.

Referring to FIG. 15B, a sixth histogram of the r-statistic of FIG. 15A after correcting the predictive model error is shown in accordance with an illustrative embodiment. A sixth PDF curve 1502 was fit to the sixth histogram. The predictive model error resulted in a mean value of −0.005023 and a standard deviation value of 0.977498.

Table 1 below further shows that combining this domain cutoff process with the scaling method from Section 2 consistently results in an in-domain r-statistic distribution with a standard deviation of roughly 1, and an out-of-domain r-statistic with a standard deviation greater than 1. For the first dataset, training set sizes of ntrain equal to 100, 500, and 1000, with all x-values drawn uniformly at random from the [0,0.5] hypercube and with $x_0$ drawn from [0,1], and the remaining x-values drawn from [0,0.5] as summarized in Table 1. For the first dataset, a first test of 10,000 observations with all x-values drawn uniformly at random from the [0,0.5] hypercube and a second test of 10,000 observations with $x_0$ drawn from [0,1], and the remaining x-values drawn from [0,0.5] are summarized in Table 1.

TABLE 1

| Dataset | In-domain stdev of r-stat distribution | Out-domain stdev of r-stat distribution | In-domain number of points | Out-domain number of points |
| --- | --- | --- | --- | --- |
| First, ntrain = 100 test $x_0$ in [0, 0.5] | 0.85 | 1.08 | 7649 | 2351 |
| First, ntrain = 100 test $x_0$ in [0, 1] | 0.99 | 4.7 | 4239 | 5761 |
| First, ntrain = 500 test $x_0$ in [0, 0.5] | 1.0 | 1.27 | 7845 | 2155 |
| First, ntrain = 500 test $x_0$ in [0, 1] | 1.0 | 4.94 | 4120 | 5880 |
| First, ntrain = 1000 test $x_0$ in [0, 0.5] | 0.89 | 1.17 | 8168 | 1832 |
| First, ntrain = 1000 test $x_0$ in [0, 1] | 0.90 | 6.1 | 4114 | 5886 |
| Second | 1.08 | 1.20 | 2246 | 1590 |
| Third | 0.93 | 1.15 | 557 | 259 |

The results in Table 1 indicate that training application 122 successfully indicates data as out-of-domain. As expected, training application 122 further computes corrected error estimates that perform poorly, for example, when $x_0$ is in [0, 1] that is outside the training range of [0,0.5]). Further, using only "in-domain" data to obtain the curve descriptive values can result in smaller, but still accurate error estimates for the same test point, assuming the test point was indicated as in-domain. For example, as shown in FIG. 9, the slope is smaller resulting in smaller error estimates because the computations were performed on data that did not include the out-of-domain observation vectors skipped in operation 234.

Table 2 below further shows that combining the domain cutoff process with the log likelihood optimization method to compute the curve descriptive values for scaling consistently results in an in-domain r-statistic distribution with a standard deviation of roughly one, and an out-of-domain r-statistic distribution with a standard deviation typically farther from one than for the in-domain data, often significantly greater than one as shown in columns two and three, respectively.

TABLE 2

| Dataset | In-domain 1 | Out-domain 1 | In-domain 2 | Out-domain 2 | In-domain points | Out-domain points |
| --- | --- | --- | --- | --- | --- | --- |
| First, ntrain = 100 test $x_0$ in [0, 0.5] | 1.014 | 1.234 | 0.841 | 0.988 | 7082 | 2918 |
| First, ntrain = 100 test $x_0$ in [0, 1] | 1.033 | 4.699 | 0.849 | 3.552 | 3710 | 6290 |
| First, ntrain = 500 test $x_0$ in [0, 0.5] | 1.067 | 1.303 | 0.882 | 1.076 | 7677 | 2323 |
| First, ntrain = 500 test $x_0$ in [0, 1] | 1.070 | 6.809 | 0.885 | 5.585 | 3852 | 6148 |
| First, ntrain = 1000 test $x_0$ in [0, 0.5] | 0.999 | 1.428 | 0.878 | 1.229 | 7875 | 2125 |
| First, ntrain = 1000 test $x_0$ in [0, 1] | 1.002 | 6.436 | 0.878 | 5.095 | 4079 | 5921 |
| Second | 0.992 | 1.300 | 0.867 | 1.136 | 2458 | 1378 |
| Third | 0.939 | 1.295 | 0.892 | 1.231 | 579 | 237 |

Columns four and five show the in-domain r-statistic distribution and the out-of-domain r-statistic distribution, respectively, computed using the log likelihood scaling method without using the domain cutoff process of operations 242 through 254 to compute the curve descriptive values for scaling. Using the log likelihood scaling method without using the domain cutoff process to compute the curve descriptive values is based on an existing method described in a paper by Hirschfeld, L., Swanson, K., Yang, K., Barzilay, R. & Coley, C. W., *Uncertainty Quantification Using Neural Networks for Molecular Property Prediction*, J. Chem. Inf. Model. 60, (2020) except assuming that the estimated standard deviation is linearly related to the true standard deviation, rather than the variances being linearly related. The number of in-domain data points is different between Tables 1 and 2 due to random variation. The calibration using only in-domain cross-validation data is substantially more accurate than the calibration using all cross-validation data because the values in column one are very close to one, while the values in column three are consistently less than one.

FIGS. 16-23 depict a "complete" set of results for a single synthetic set with a training set size of 500. Correction factors were obtained through cross-validation and results were computed by predicting on a test set of size n=10,000. For all results, both test and training data was generated with the function y=30 sin $(4\pi x_0 x_1)$+20$(x_2-0.5)^2$+10$x_3$+5$x_4$, with features generated uniformly at random from the range [0,0.5].

Figure 16:
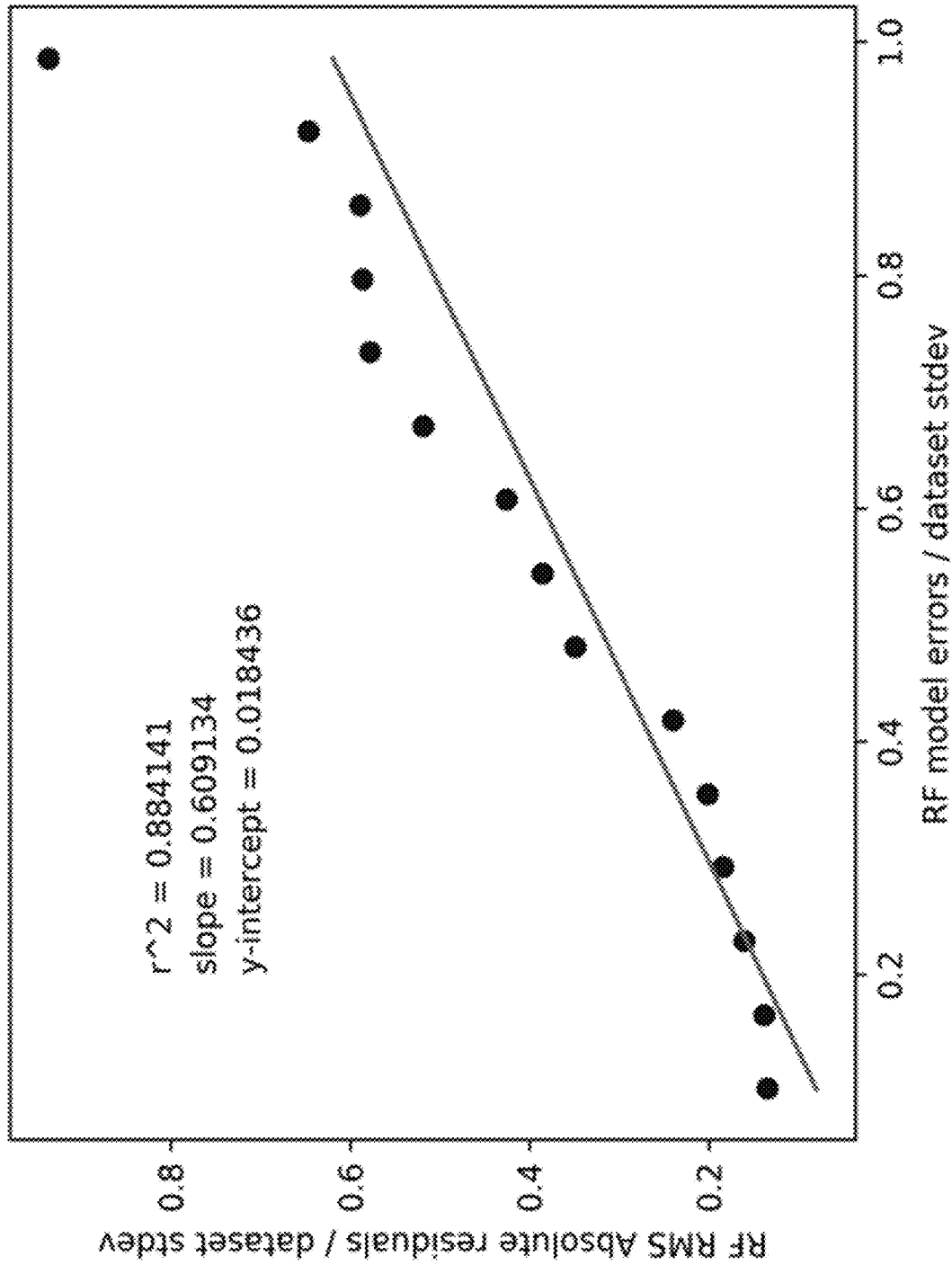
FIGS. 16-27 show additional results in accordance with an illustrative embodiment.
Figure 17:
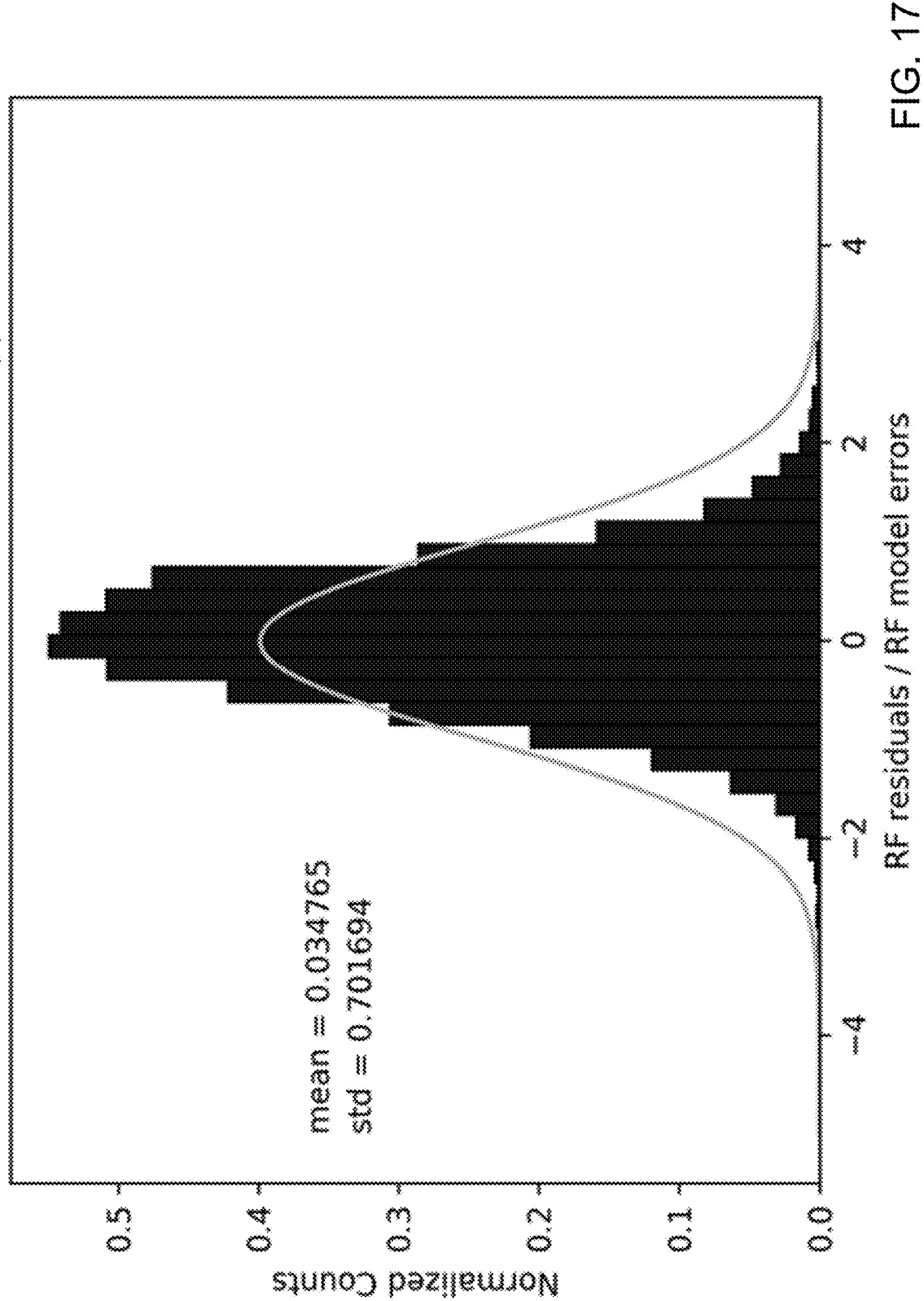

FIGS. 16 and 17 show predictions with uncorrected error estimates for predictions on the entire test set.

Figure 18:
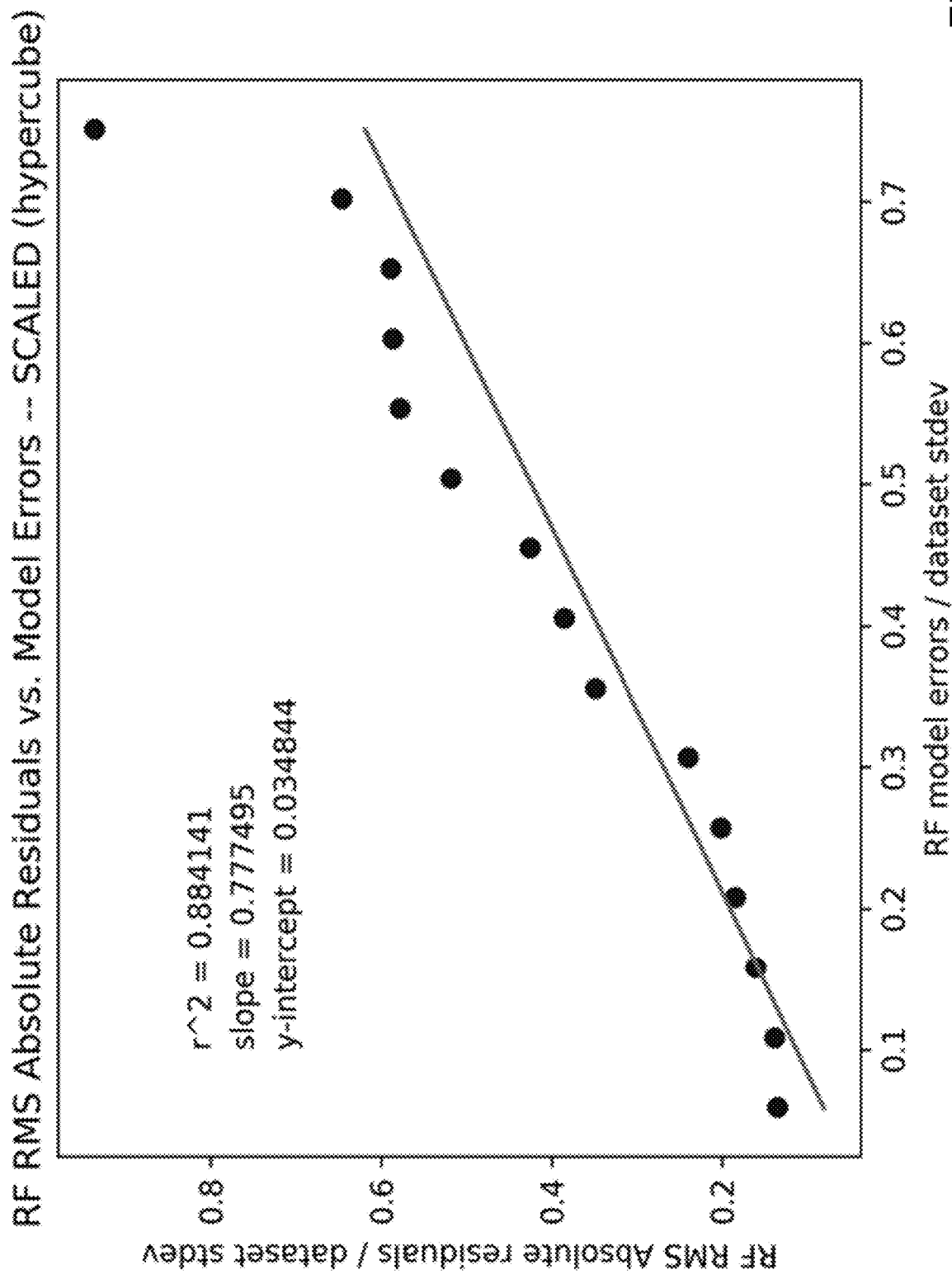
Figure 19:
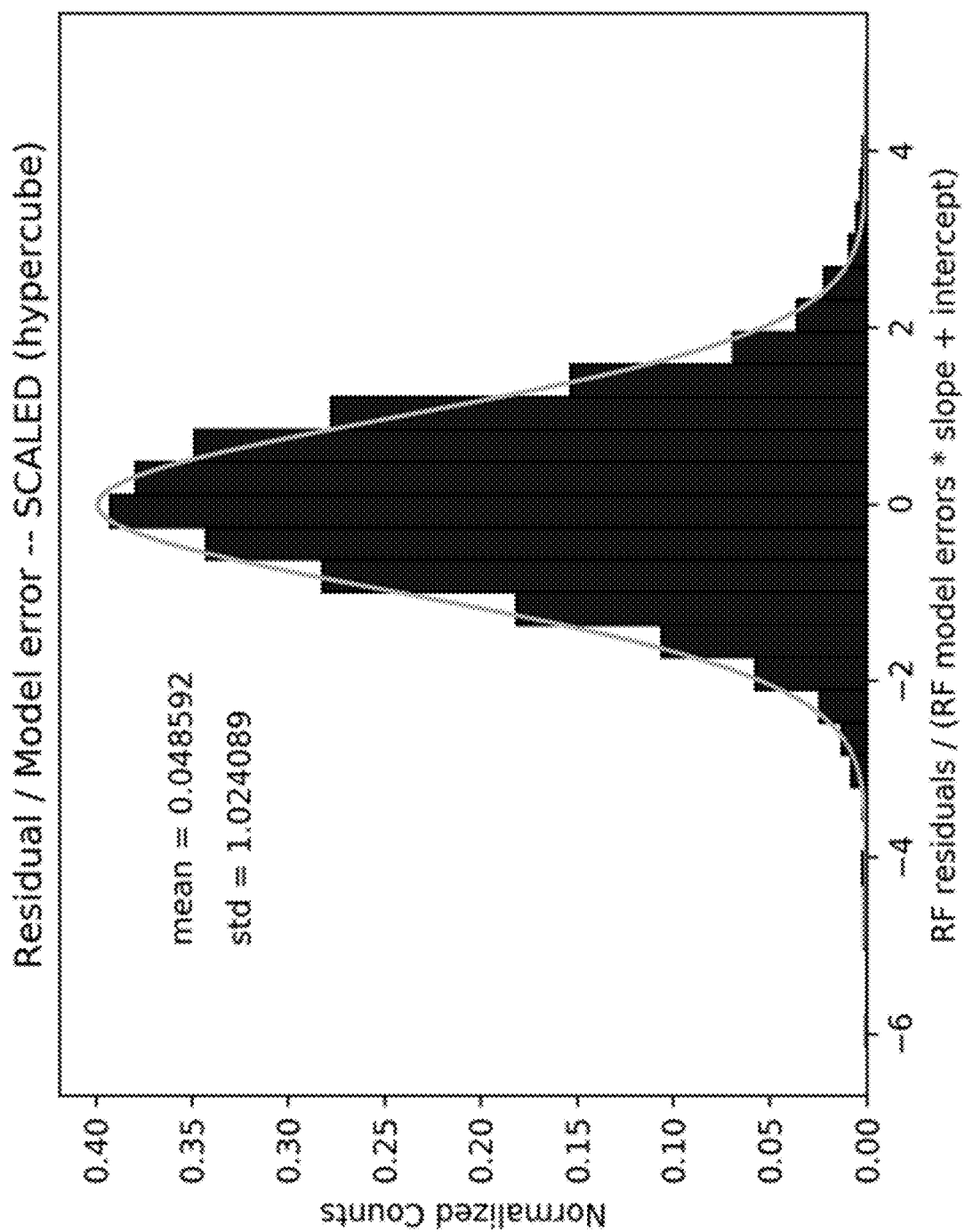

FIGS. 18 and 19 show predictions with corrected error estimates for predictions on entire test set. Scale factors obtained in cross-validation and applied here: slope=0.783457, intercept=−0.0211046. (i.e., all initial model errors here were multiplied by 0.783457 and then added to −0.0211046.)

Figure 20:
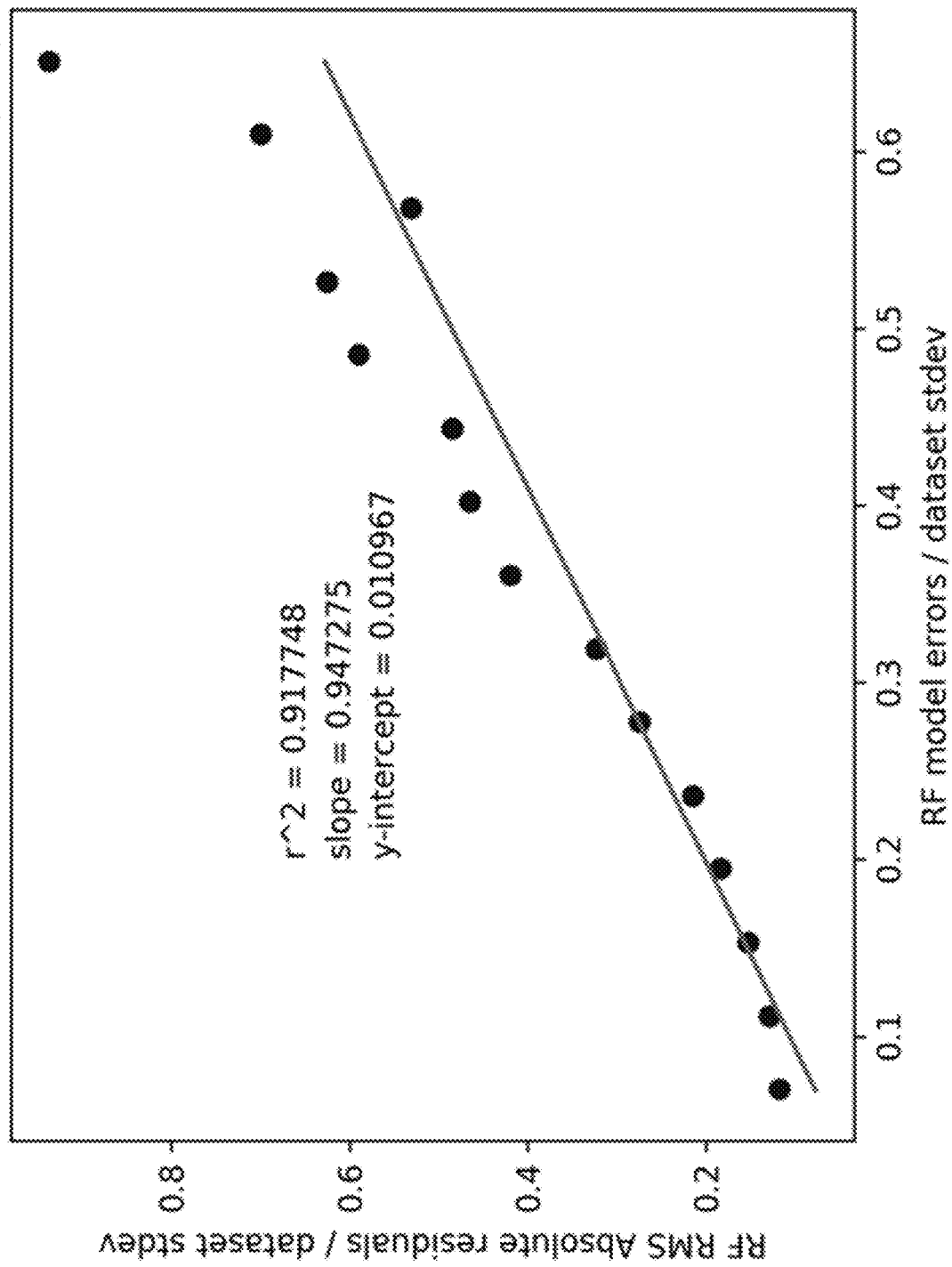
Figure 21:
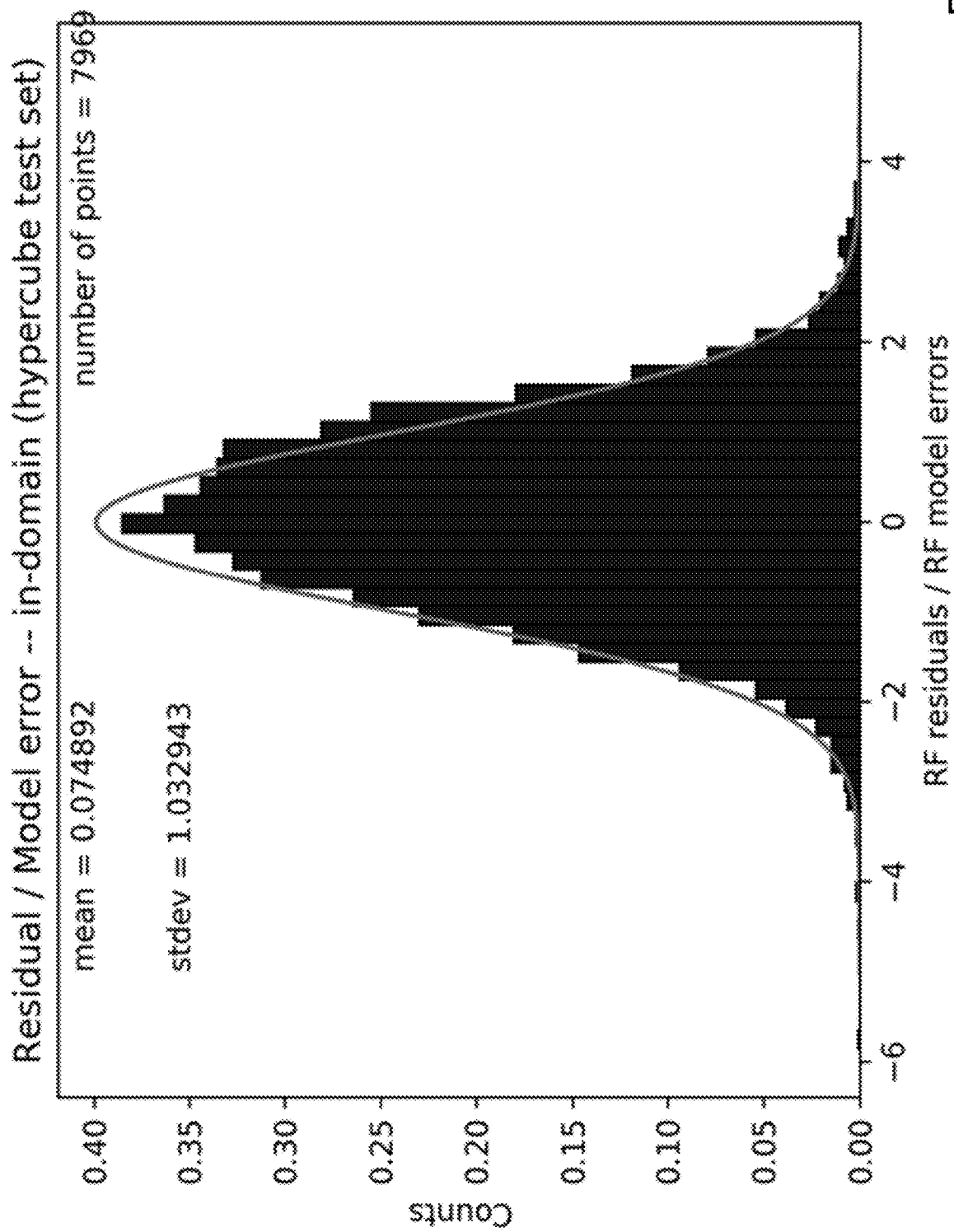

FIGS. 20 and 21 show predictions with corrected error estimates only for in-domain test data. scale factors obtained using in-domain cross-validation data and applied here: slope=0.6233448, intercept=0.00121021. (i.e., all initial model errors here were multiplied by 0.6233448 and then added to 0.00121021.) The cutoff for being in-domain was a GPR error estimate of 0.01025748.

Figure 22:
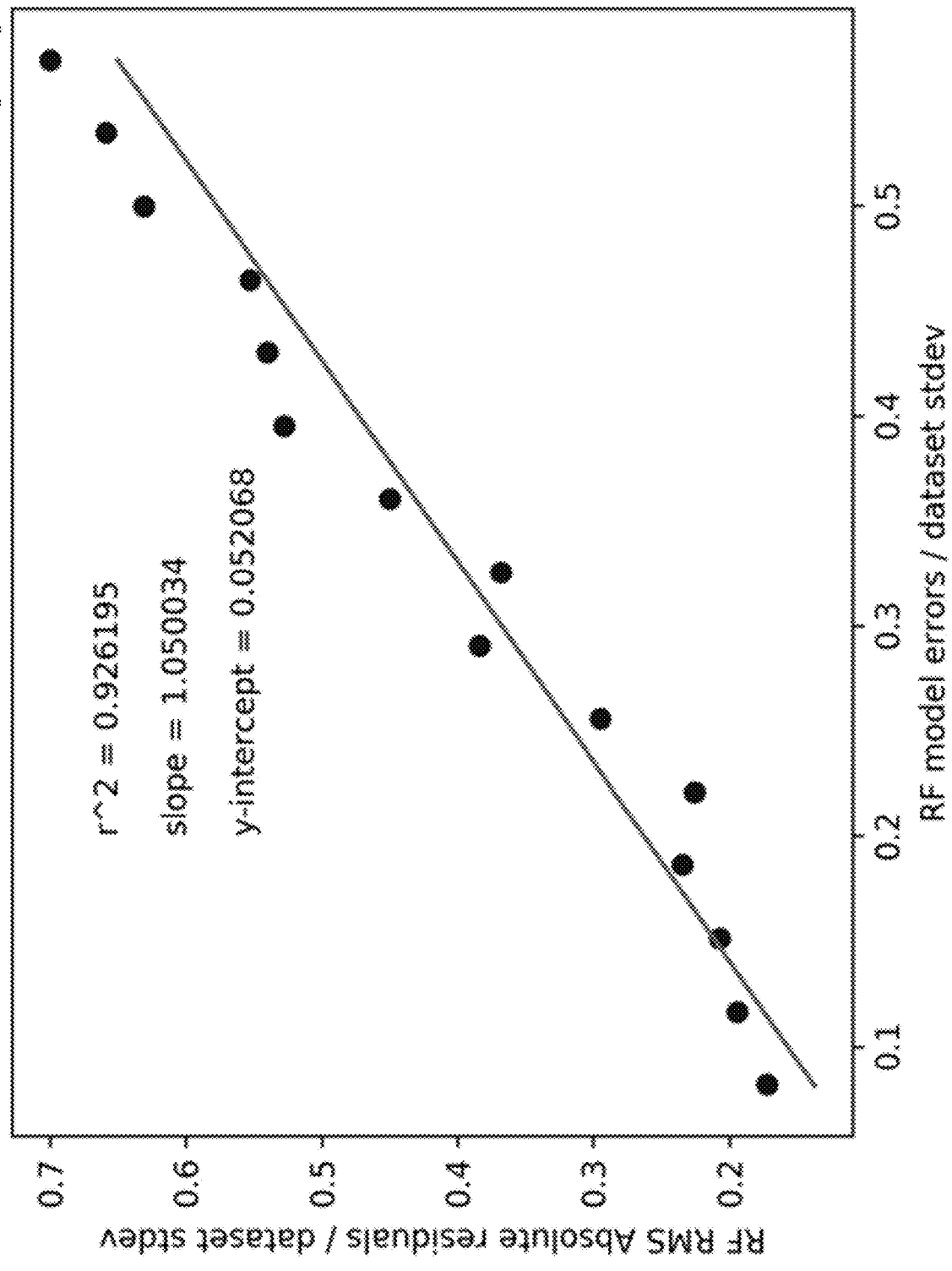
Figure 23:
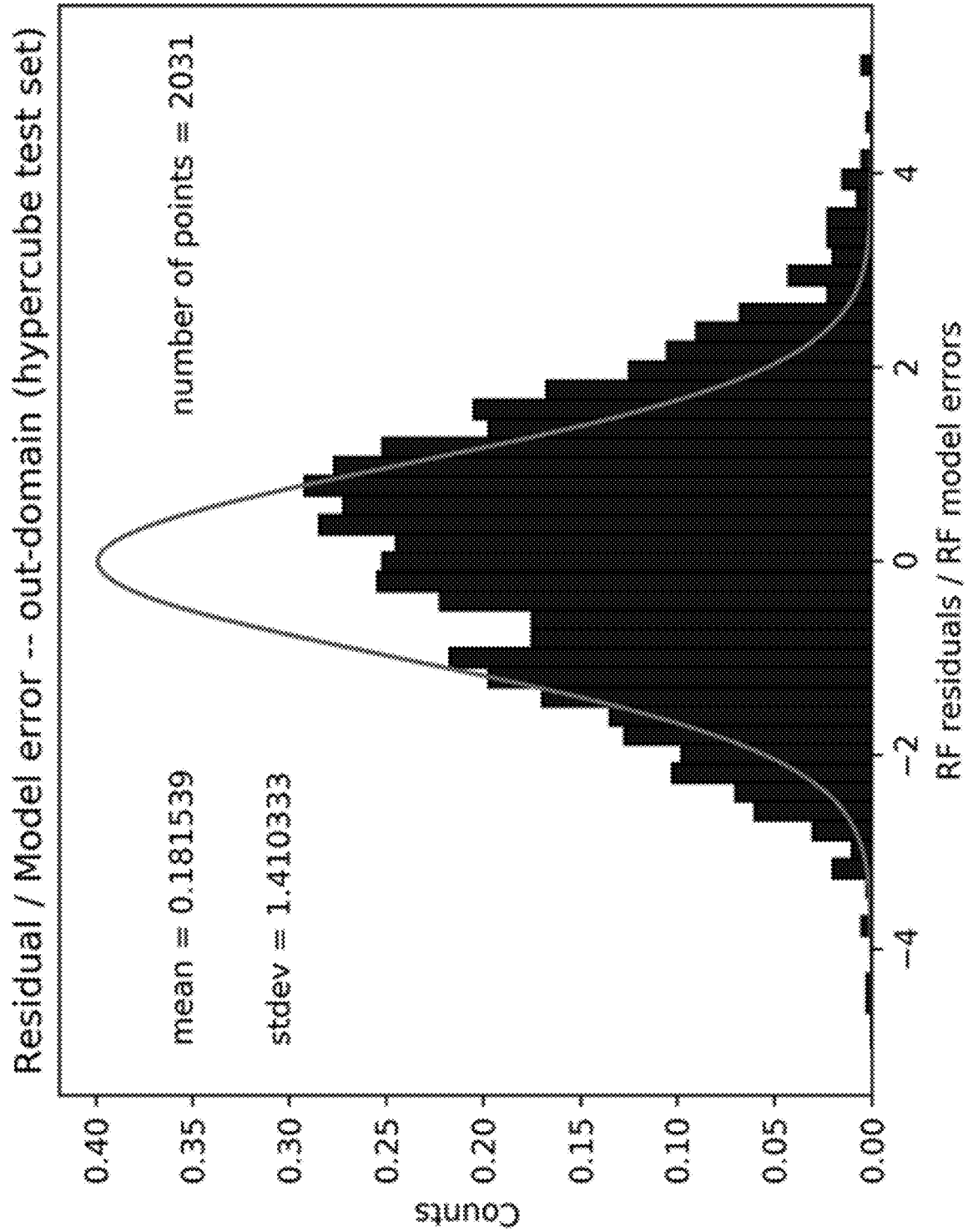

FIGS. 22 and 23 show predictions with corrected error estimates only for out-of-domain test data. Scale factors obtained using in-domain cross-validation data and applied here: slope=0.6233448, intercept=0.00121021. (i.e., all initial model errors here were multiplied by 0.6233448 and then added to 0.00121021.) The cutoff for being in-domain was a GPR error estimate of 0.01025748.

Figure 24:
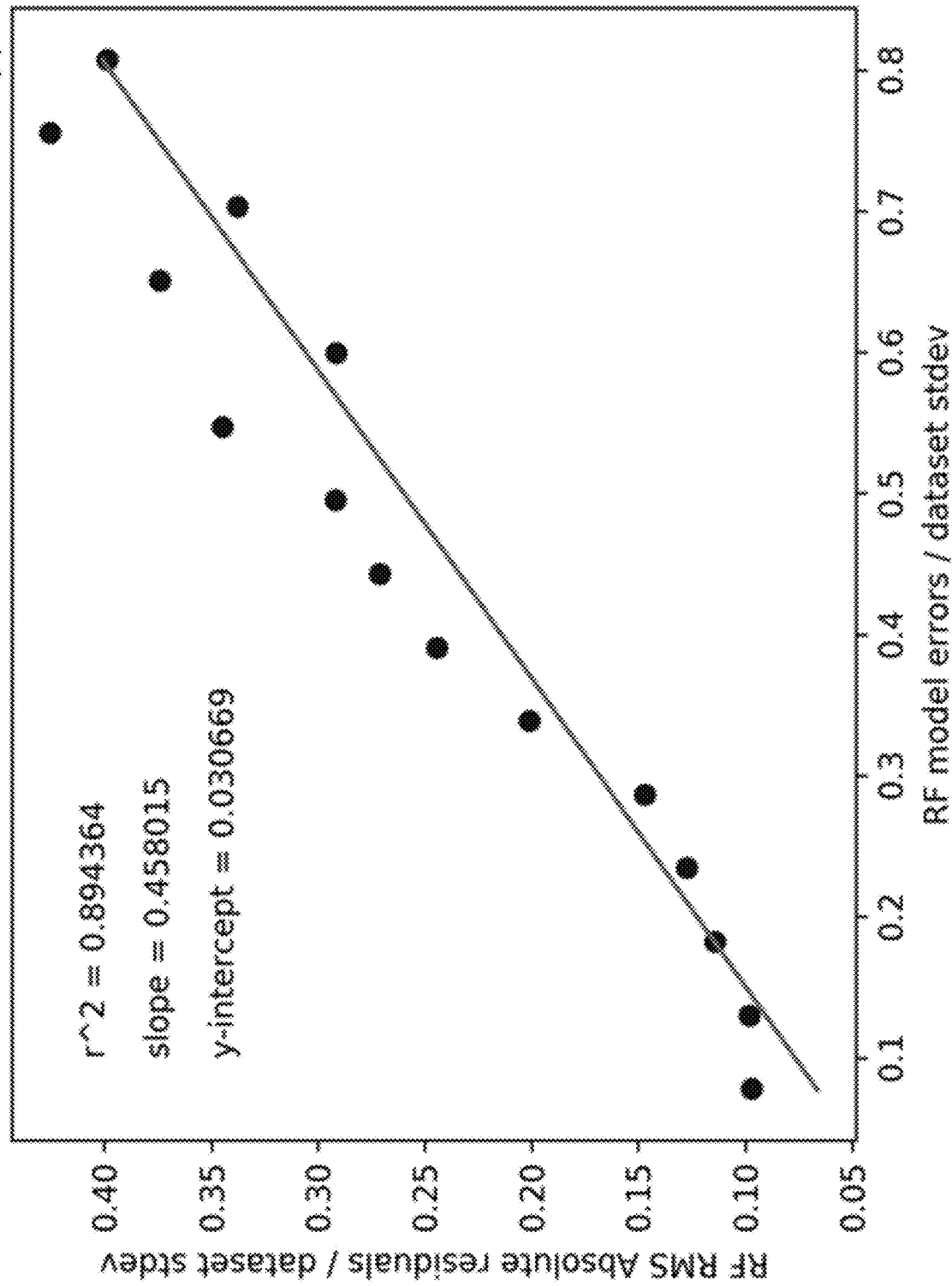
Figure 25:
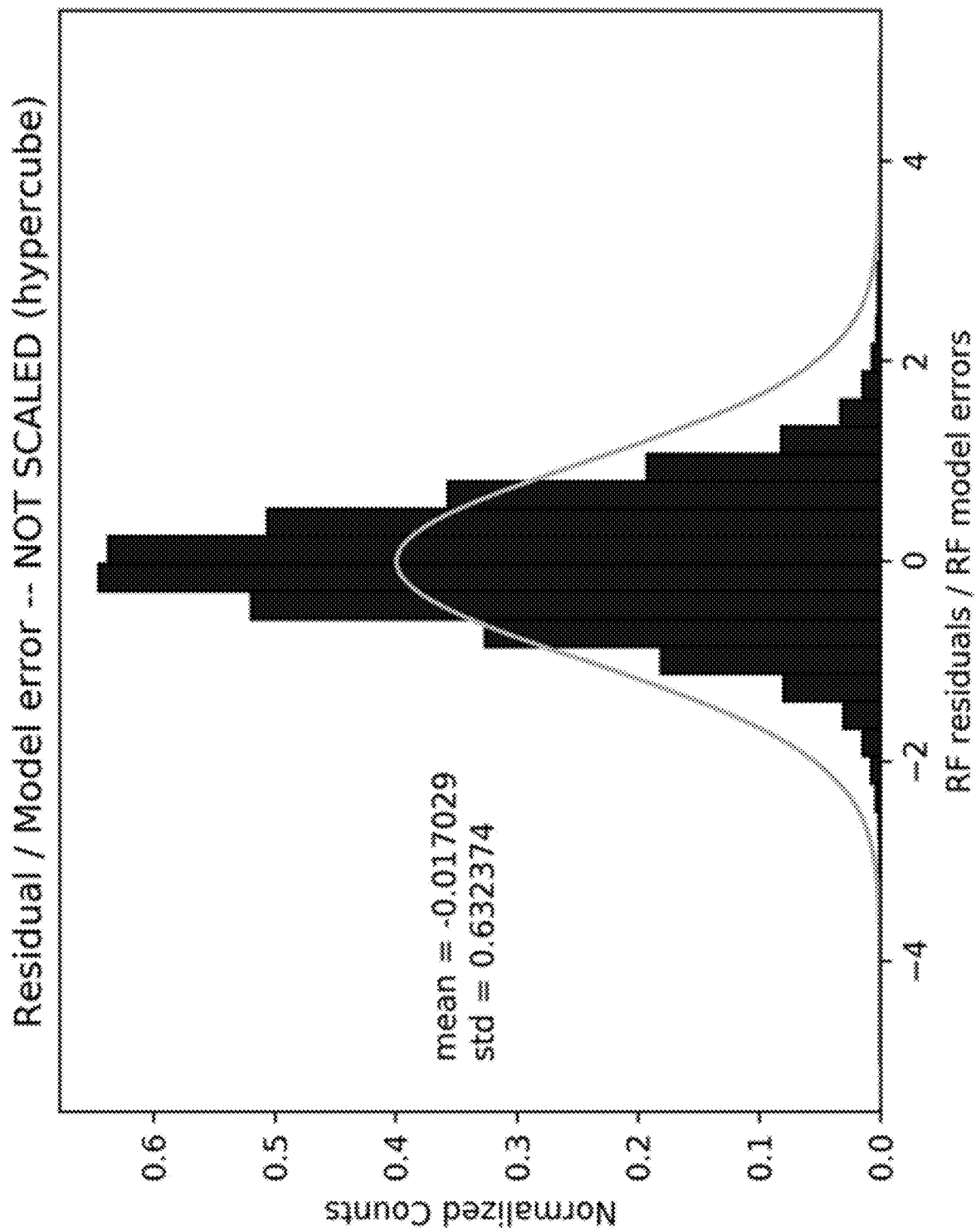

FIGS. 24 and 25 show predictions with uncorrected error estimates for predictions on the entire test set using a training set of 2000 points.

Figure 26:
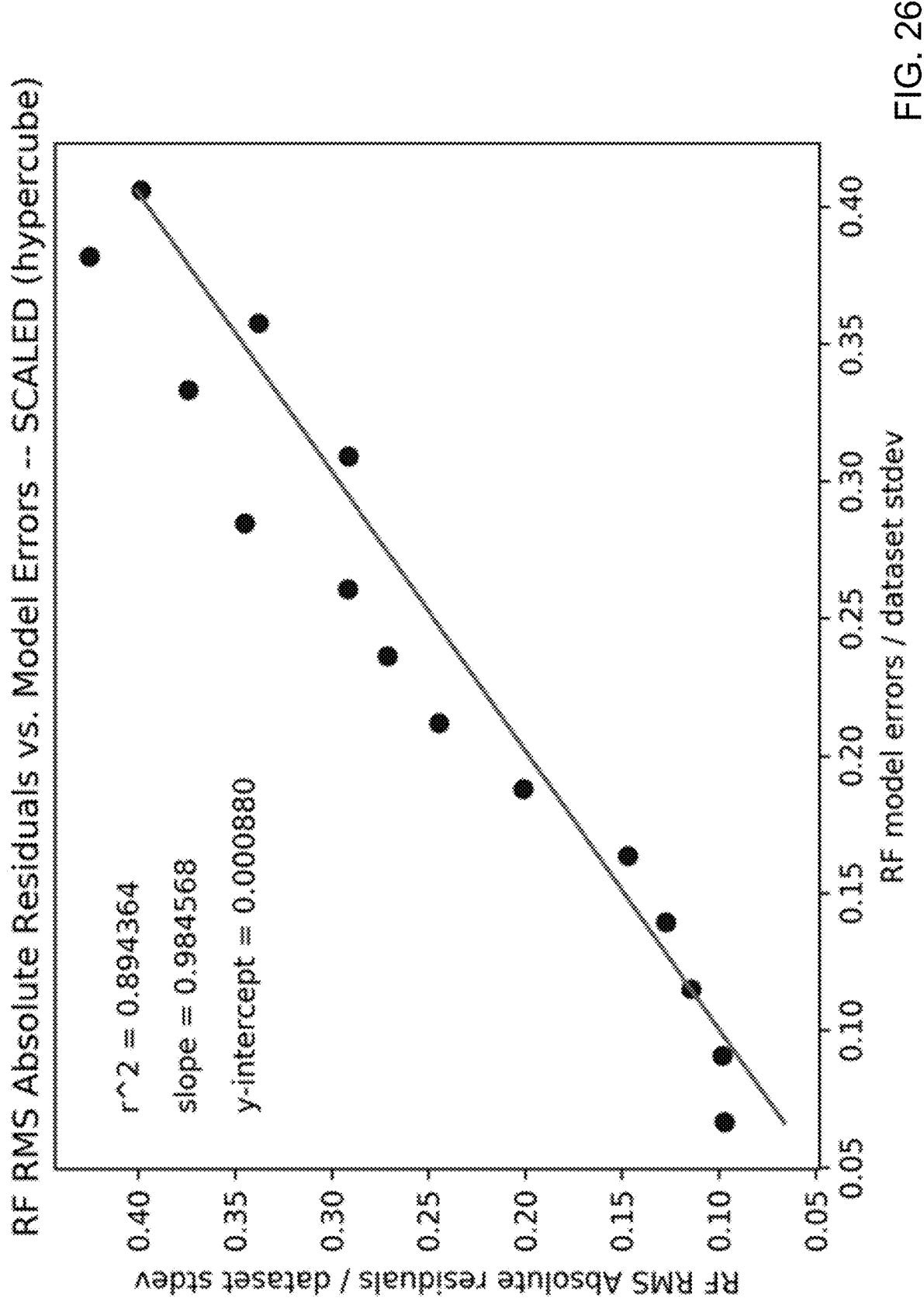
Figure 27:
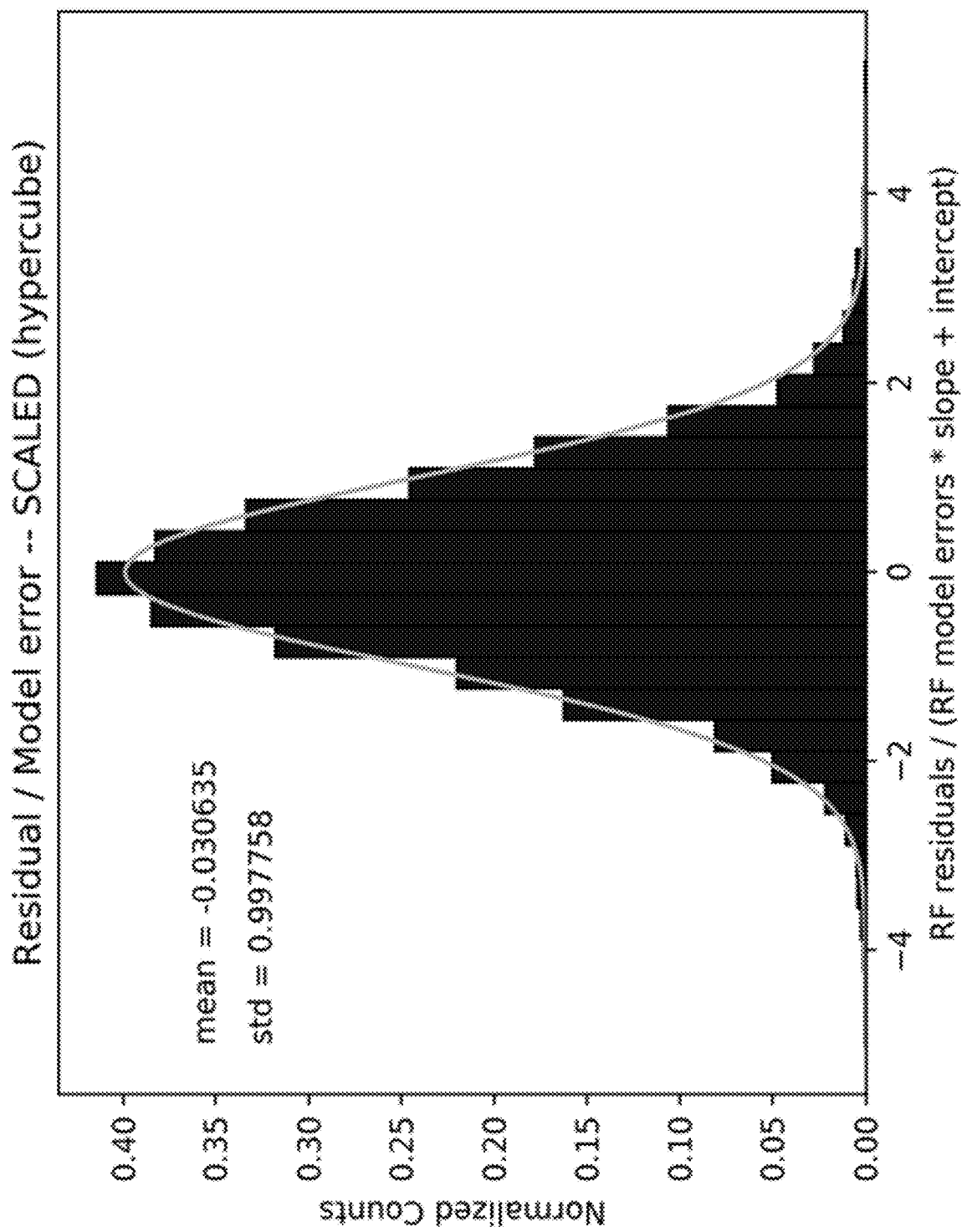

FIGS. 26 and 27 show predictions with corrected error estimates for predictions on entire test set using a training set of 2000 points. Scale factors obtained in cross-validation and applied here: slope=0.4651939, intercept=0.0302558. (i.e., all initial model errors here were multiplied by 0.4651939 and then added to 0.0302558.)

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) split an input dataset received from a distributed computer system into a training dataset and a validation dataset, wherein the input dataset includes a plurality of observation vectors;
   (B) define a predictive model description and a domain model description based on the input dataset;
   (C) train a predictive model associated with the predictive model description with the training dataset subsequent to defining the predictive model description;
   (D) train a domain model associated with the domain model description with the training dataset subsequent to defining the domain model description;
   (E) validate the trained predictive model with the validation dataset;
   (F) validate the trained domain model with the validation dataset;
   (G) compute a predictive error value and a residual value from the validated predictive model for each observation vector of the plurality of observation vectors included in the validation dataset;
   (H) compute a domain error value from the validated domain model for each observation vector of the plurality of observation vectors included in the validation dataset;
   (I) store the computed predictive error value, the computed residual value, and the computed domain error value in output data for each observation vector of the plurality of observation vectors included in the validation dataset;
   (J) repeat (A) through (I) a predefined number of times;
   (K) compute a domain threshold value using the stored domain error values;
   (L) store each predictive error value and each residual value stored in the output data in in-domain output data when a respective stored domain error value is less than or equal to the computed domain threshold value;
   (M) compute curve descriptive values based on a type of curve, wherein the curve describes a relationship between the residual values stored in the in-domain output data as a function of the prediction error values stored in the in-domain output data;
   (N) output the curve descriptive values to correct an error estimate value of a predicted value of a new observation vector; and
   (O) provide an indication of the error estimate value of the predicted value of the new observation vector to the distributed computing system.

2. The non-transitory computer-readable medium of claim 1, wherein after (L) and before (M), the computer-readable instructions further cause the computing device to:
   compute a standard deviation value from a total predictive error value and each predictive error values stored in the in-domain output data;
   divide each predictive error value stored in the in-domain output data by the computed standard deviation value to compute a scaled, predictive error value, wherein the predictive error value in (M) is the scaled, predictive error value; and
   divide each residual value stored in the in-domain output data by the computed standard deviation value to compute a scaled, residual value, wherein the residual value in (M) is the scaled, residual value.

3. The non-transitory computer-readable medium of claim 2, wherein the computer-readable instructions further cause the computing device to:
   (P) train a second predictive model using the plurality of observation vectors included in the input dataset;

(Q) train a second domain model using the plurality of observation vectors included in the input dataset;
output a first description of the trained second predictive model; and
output a second description of the trained second domain model.

4. The non-transitory computer-readable medium of claim 3, wherein an average domain threshold value is computed from each domain threshold value computed in (J).

5. The non-transitory computer-readable medium of claim 4, wherein after (P), the computer-readable instructions further cause the computing device to:
compute a predicted domain error value for a new observation vector using the trained second domain model, wherein the new observation vector is not included in the input dataset; and
when the computed predicted domain error value is less than the computed domain threshold value,
compute a predicted value of the new observation vector and an error estimate value associated with the computed predicted value using the trained second predictive model; and
correct the error estimate value of the computed predicted value using the computed curve descriptive values; and
output the computed predicted value and the corrected error estimate value of the new observation vector.

6. The non-transitory computer-readable medium of claim 5, wherein, when the computed predicted domain error value is greater than the computed domain threshold value, the computer-readable instructions further cause the computing device to output an out of domain indicator for the new observation vector.

7. The non-transitory computer-readable medium of claim 1, wherein the computer-readable instructions further cause the computing device to:
(P) train a second predictive model using the plurality of observation vectors included in the input dataset; and
(Q) output a description of the trained second predictive model.

8. The non-transitory computer-readable medium of claim 7, wherein
after (P), the computer-readable instructions further cause the computing device to:
compute a predicted value of a new observation vector and an error estimate value associated with the computed predicted value using the trained second predictive model, wherein the new observation vector is not included in the input dataset;
correct the error estimate value of the computed predicted value using the computed curve descriptive values; and
output the computed predicted value and the corrected error estimate value of the new observation vector.

9. The non-transitory computer-readable medium of claim 1, wherein the computer-readable instructions further cause the computing device to:
(P) train a second predictive model using the plurality of observation vectors included in the input dataset;
(Q) train a second domain model using the plurality of observation vectors included in the input dataset;
output a first description of the trained second predictive model; and
output a second description of the trained second domain model.

10. The non-transitory computer-readable medium of claim 9, wherein an average domain threshold value is computed from each domain threshold value computed in (J).

11. The non-transitory computer-readable medium of claim 10, wherein after (P), the computer-readable instructions further cause the computing device to:
compute a predicted domain error value for a new observation vector using the trained second domain model, wherein the new observation vector is not included in the input dataset; and
when the computed predicted domain error value is less than the computed domain threshold value,
compute a predicted value of the new observation vector and an error estimate value associated with the computed predicted value using the trained second predictive model; and
correct the error estimate value of the computed predicted value using the computed curve descriptive values; and
output the computed predicted value and the corrected error estimate value of the new observation vector.

12. The non-transitory computer-readable medium of claim 11, wherein, when the computed predicted domain error value is greater than the computed domain threshold value, the computer-readable instructions further cause the computing device to output an out of domain indicator for the new observation vector.

13. The non-transitory computer-readable medium of claim 1, wherein the computed curve descriptive values include a slope and a y-intercept value.

14. The non-transitory computer-readable medium of claim 1, wherein the computed curve descriptive values include a plurality of polynomial coefficients.

15. The non-transitory computer-readable medium of claim 1, wherein the domain threshold value is a mean value computed from each domain error value stored in the output data.

16. The non-transitory computer-readable medium of claim 1, wherein the domain threshold value is a predefined percentage value computed from each domain error value stored in the output data.

17. The non-transitory computer-readable medium of claim 1, wherein a model type of the domain model is a Gaussian process regression model type.

18. The non-transitory computer-readable medium of claim 1, wherein the domain error value is a distance value computed between observation vectors included in the validation dataset.

19. A computing device comprising:
a processor; and
a non-transitory computer-readable medium operably coupled to the processor, the computer-readable medium having computer-readable instructions stored thereon that, when executed by the processor, cause the computing device to
(A) split an input dataset received from a distributed computer system into a training dataset and a validation dataset, wherein the input dataset includes a plurality of observation vectors;
(B) define a predictive model description and a domain model description based on the input dataset;
(C) train a predictive model associated with the predictive model description with the training dataset subsequent to defining the predictive model description;
(D) train a domain model associated with the domain model description with the training dataset subsequent to defining the domain model description;
(E) validate the trained predictive model with the validation dataset;
(F) validate the trained domain model with the validation dataset;

(G) compute a predictive error value and a residual value from the validated predictive model for each observation vector of the plurality of observation vectors included in the validation dataset;
(H) compute a domain error value from the validated domain model for each observation vector of the plurality of observation vectors included in the validation dataset;
(I) store the computed predictive error value, the computed residual value, and the computed domain error value in output data for each observation vector of the plurality of observation vectors included in the validation dataset;
(J) repeat (A) through (I) a predefined number of times;
(K) compute a domain threshold value using the stored domain error values;
(L) store each predictive error value and each residual value stored in the output data in in-domain output data when a respective stored domain error value is less than or equal to the computed domain threshold value;
(M) compute curve descriptive values based on a type of curve, wherein the curve describes a relationship between the residual values stored in the in-domain output data as a function of the prediction error values stored in the in-domain output data;
(N) output the curve descriptive values to correct an error estimate value of a predicted value of a new observation vector; and
(O) provide an indication of the error estimate value of the predicted value of the new observation vector to the distributed computing system.

20. A method of computing an error estimate correction for a machine learning model, the method comprising:
(A) splitting, by a computing device, an input dataset received from a distributed computer system into a training dataset and a validation dataset, wherein the input dataset includes a plurality of observation vectors;
(B) defining, by the computing device, a predictive model description and a domain model description based on the input dataset;
(C) training, by the computing device, a predictive model with the training dataset;
(D) training, by the computing device, a domain model associated with the predictive model description with the training dataset subsequent to defining the predictive model description;
(E) validating, by the computing device, the trained predictive model with the validation dataset;
(F) validating, by the computing device, the trained domain model with the validation dataset;
(G) computing, by the computing device, a predictive error value and a residual value from the validated predictive model for each observation vector of the plurality of observation vectors included in the validation dataset;
(H) computing, by the computing device, a domain error value from the validated domain model for each observation vector of the plurality of observation vectors included in the validation dataset;
(I) storing, by the computing device, the computed predictive error value, the computed residual value, and the computed domain error value in output data for each observation vector of the plurality of observation vectors included in the validation dataset;
(J) repeating, by the computing device, (A) through (I) a predefined number of times;
(K) computing, by the computing device, a domain threshold value using the stored domain error values;
(L) storing, by the computing device, each predictive error value and each residual value stored in the output data in in-domain output data when a respective stored domain error value is less than or equal to the computed domain threshold value;
(M) computing, by the computing device, curve descriptive values based on a type of curve, wherein the curve describes a relationship between the residual values stored in the in-domain output data as a function of the prediction error values stored in the in-domain output data;
(N) outputting, by the computing device, the curve descriptive values to correct an error estimate value of a predicted value of a new observation vector; and
(O) providing, by the computing device, an indication of the error estimate value of the predicted value of the new observation vector to the distributed computing system.

* * * * *